US010764521B2

(12) United States Patent
Usui et al.

(10) Patent No.: US 10,764,521 B2
(45) Date of Patent: Sep. 1, 2020

(54) IMAGE SENSOR AND ELECTRONIC DEVICE COMPRISING THE SAME

(71) Applicant: Samsung Electronics Co., Ltd., Gyeonggi-do (KR)

(72) Inventors: Takafumi Usui, Gyeonggi-do (KR); Makoto Takamiya, Gyeonggi-do (KR); Shuichi Shimokawa, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 245 days.

(21) Appl. No.: 15/870,403

(22) Filed: Jan. 12, 2018

(65) Prior Publication Data

US 2018/0213142 A1    Jul. 26, 2018

(30) Foreign Application Priority Data

Jan. 23, 2017    (KR) .................. 10-2017-0010503

(51) Int. Cl.
*H04N 5/369* (2011.01)
*H04N 9/04* (2006.01)
(Continued)

(52) U.S. Cl.
CPC .......... *H04N 5/3696* (2013.01); *G02B 7/346* (2013.01); *H04N 5/23287* (2013.01);
(Continued)

(58) Field of Classification Search
CPC .......... H04N 5/232122; H04N 5/3696; H04N 5/36961; H04N 5/37457; H04N 9/045;
(Continued)

(56) References Cited

U.S. PATENT DOCUMENTS 7,990,444 B2    8/2011  Kudoh
8,384,807 B2    2/2013  Yamada
(Continued)

FOREIGN PATENT DOCUMENTS

JP    2001083407    3/2001
JP    2009-206210    9/2009
(Continued)

OTHER PUBLICATIONS

International Search Report dated May 4, 2018 issued in counterpart application No. PCT/KR2018/000637, 10 pages.

*Primary Examiner* — Daniel M Pasiewicz
(74) *Attorney, Agent, or Firm* — The Farrell Law Firm, P.C.

(57) ABSTRACT

An image sensor is provided which includes a first group of pixels including a first color filter passing light having a first wavelength range, a second group of pixels including a second color filter passing light having a second wavelength range, and a third group of pixels including a third color filter passing light having a third wavelength range. The first wavelength range is longer than the second wavelength range, and the second wavelength range is longer than the third wavelength range. A second pixel in the second group of pixels or a third pixel in the third group of pixels includes a plurality of photoelectric conversion devices, and a first pixel of the first group of pixels includes a single photoelectric conversion device.

12 Claims, 26 Drawing Sheets

(51) Int. Cl.
*G02B 7/34* (2006.01)
*H04N 5/361* (2011.01)
*H04N 5/232* (2006.01)
*H04N 5/3745* (2011.01)
*H04N 5/357* (2011.01)

(52) U.S. Cl.
CPC ..... *H04N 5/232122* (2018.08); *H04N 5/3575* (2013.01); *H04N 5/361* (2013.01); *H04N 5/36961* (2018.08); *H04N 5/37457* (2013.01); *H04N 9/045* (2013.01); *H04N 9/04557* (2018.08); *H04N 9/04559* (2018.08); *H04N 9/04561* (2018.08)

(58) Field of Classification Search
CPC ........... H04N 9/04557; H04N 9/04559; H04N 9/04561
See application file for complete search history.

(56) References Cited

U.S. PATENT DOCUMENTS

| | | | |
|---|---|---|---|
| 9,377,601 | B2 | 6/2016 | Kusaka |
| 9,478,575 | B2 | 10/2016 | Kato |
| 9,948,849 | B2 | 4/2018 | Kim et al. |
| 2006/0109358 | A1* | 5/2006 | Song ...................... H04N 9/045 348/275 |
| 2009/0213256 | A1 | 8/2009 | Kudoh |
| 2012/0038801 | A1 | 2/2012 | Yamada |
| 2014/0145287 | A1 | 5/2014 | Kato |
| 2015/0234148 | A1 | 8/2015 | Kusaka |
| 2015/0256778 | A1* | 9/2015 | Kusaka .................. G03B 13/36 348/302 |
| 2016/0277658 | A1 | 9/2016 | Kim et al. |
| 2016/0277669 | A1 | 9/2016 | Kusaka |
| 2016/0301897 | A1 | 10/2016 | Huang et al. |
| 2016/0353043 | A1* | 12/2016 | Kishi ..................... H04N 5/378 |
| 2017/0041563 | A1* | 2/2017 | Suzuki ............... H04N 5/37457 |

FOREIGN PATENT DOCUMENTS

| | | |
|---|---|---|
| JP | 2011-109335 | 6/2011 |
| JP | 2013-055159 | 3/2013 |
| JP | 2014041202 | 3/2014 |
| JP | 2014072541 | 4/2014 |
| JP | 2016-201524 | 12/2016 |
| KR | 1020160111121 | 9/2016 |

* cited by examiner

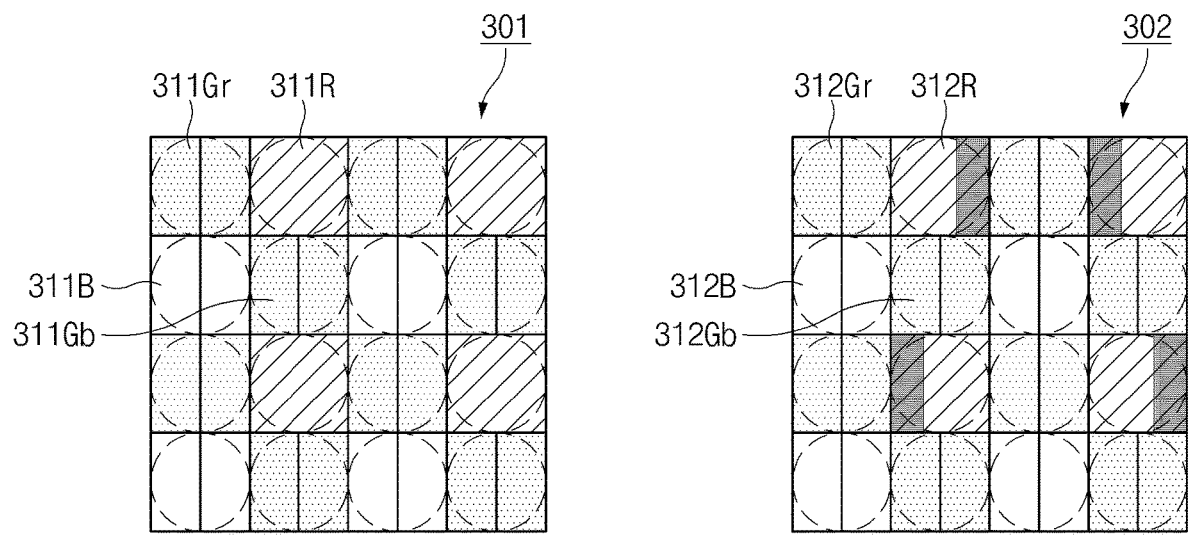
F I G. 3A

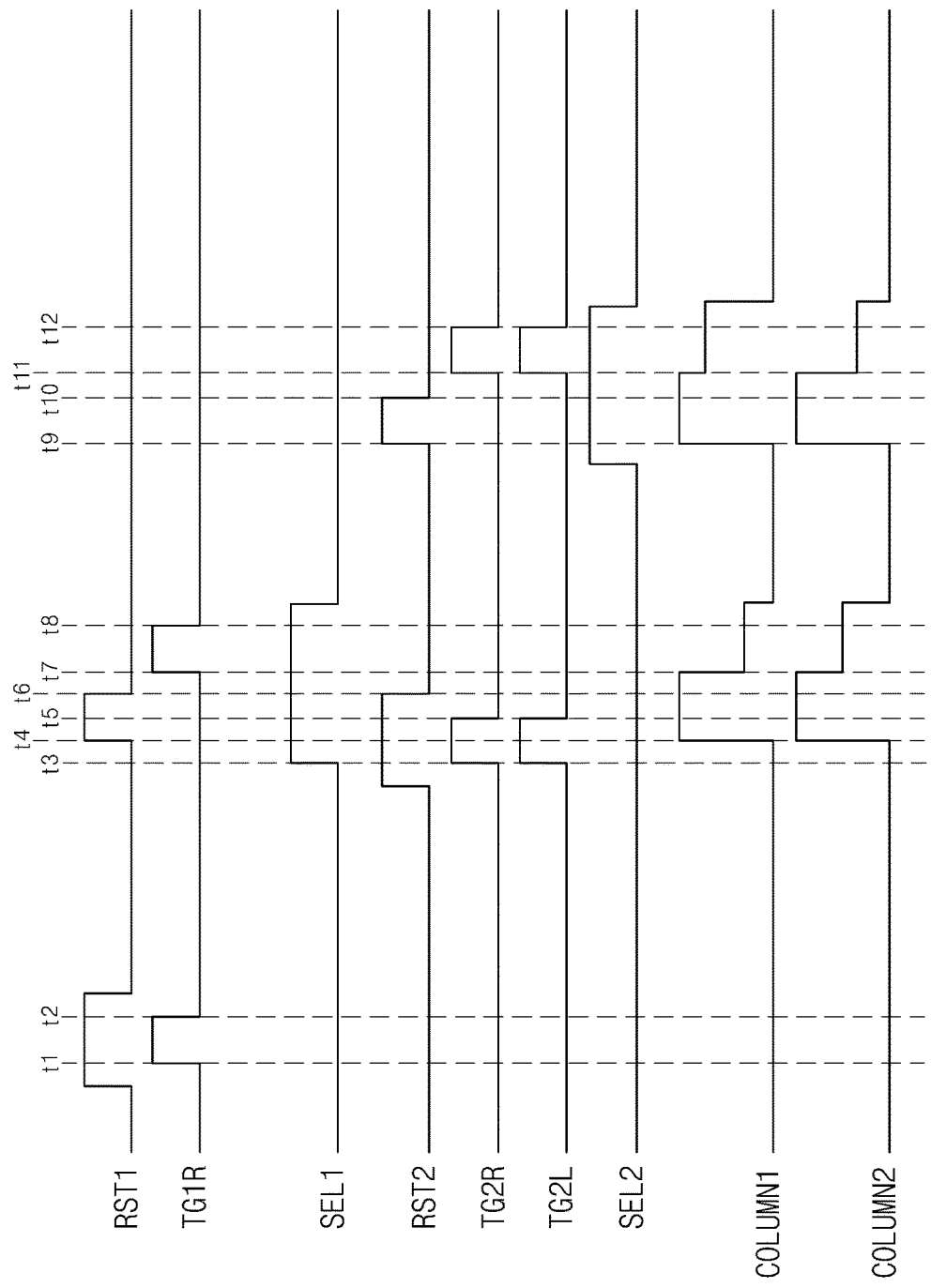

IMAGE SENSOR AND ELECTRONIC DEVICE COMPRISING THE SAME

PRIORITY

This application claims priority under 35 U.S.C. § 119(a) to Korean Patent Application Serial No. 10-2017-0010503, which was filed in the Korean Intellectual Property Office on Jan. 23, 2017, the entire content of which is incorporated herein by reference.

BACKGROUND

1. Field of the Disclosure

The present disclosure relates generally to an image sensor and an electronic device including the image sensor.

2. Description of the Related Art

With the development of information technologies (IT), a camera has evolved from a traditional film camera into a digital camera. The digital camera may convert light into an electrical image signal and may store the electrical image signal as digital data (e.g., image data).

An electronic device may have an image sensor to create the image data. The image sensor may include several millions to several tens of millions of pixels, each of which includes a photoelectric conversion device. In the photoelectric conversion device, the movement of charges, that is, a current occurs according to the photoelectric effect. The current may be converted into a digital signal and thus the digital image data may be created.

As camera modules for electronic devices have shrunk in size, pixel sizes in image sensors have also shrunk.

To acquire the image data, especially color image data, an optical color filter may be inserted above each pixel. For example, the optical color filter may have the arrangement of a Bayer pattern formed by the filter the primary colors of red, green, and blue (RGB).

Red light, having the wavelength of about 700 nm, may be incident to a pixel having a red color filter according to the Bayer pattern. In this case, if the red light is polarized in a shorter-side direction of the pixel having the pitch of 0.7 μm or less, the red light sensitivity of an image may be degraded.

SUMMARY

Aspects of the present disclosure are to address at least the above-mentioned problems and/or disadvantages and to provide at least the advantages described below. Accordingly, an aspect of the present disclosure is to provide an image sensor capable of preventing the sensitivity to the red light from being degraded even if a pixel size is reduced by designing the number of photoelectric conversion devices provided in each pixel and the arrangement structure of the photoelectric conversion devices in various manners, and an electronic device including the same.

In accordance with an aspect of the present disclosure, an image sensor includes a first group of pixels including a first color filter passing light having a first wavelength range; a second group of pixels including a second color filter passing light having a second wavelength range; and a third group of pixels including a third color filter passing light having a third wavelength range. The first wavelength range may be designed to be longer than the second wavelength range, and the second wavelength range may be designed to be longer than the third wavelength range. A second pixel in the second group of pixels or a third pixel in the third group of pixels may include a plurality of photoelectric conversion devices, and a first pixel of the first group of pixels may include a single photoelectric conversion device.

In accordance with another aspect of the present disclosure, an image sensor includes a first group of pixels including a first color filter passing light having a first wavelength range; a second group of pixels including a second color filter passing light having a second wavelength range, and a third group of pixels including a third color filter passing light having a third wavelength range. The first wavelength range is longer than the second wavelength range, and the second wavelength range is longer than the third wavelength range. A first pixel in the first group of pixels includes two photoelectric conversion devices, and the two photoelectric conversion devices included in the first pixel are disposed in regions obtained by splitting the first pixel in a diagonal direction.

In accordance with another aspect of the present disclosure, an electronic device includes a lens configured to concentrate light incident thereto from an outside; an image sensor configured to generate an image signal based on the light; and an image processor that processes the image signal. The image sensor includes a first group of pixels including a first color filter passing light having a first wavelength range; a second group of pixels including a second color filter passing light having a second wavelength range shorter than the first wavelength range; and a third group of pixels including a third color filter passing light having a third wavelength range shorter than the second wavelength range. A some pixels in the second group of pixels includes two photoelectric conversion devices, and each remaining pixel in the second group of pixels may include one photoelectric conversion device. The image processor is configured to correct a characteristic difference between image signals generated from the some pixels in the second group of pixels and image signals generated from the remaining pixels in the second group of pixels.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3A illustrates a pixel array of an image sensor, according to an embodiment of the present disclosure;

FIGS. 6A and 6B are timing diagrams illustrating the operations of a control line and an output line, according to an embodiment of the present disclosure;

DETAILED DESCRIPTION

Figure 1:
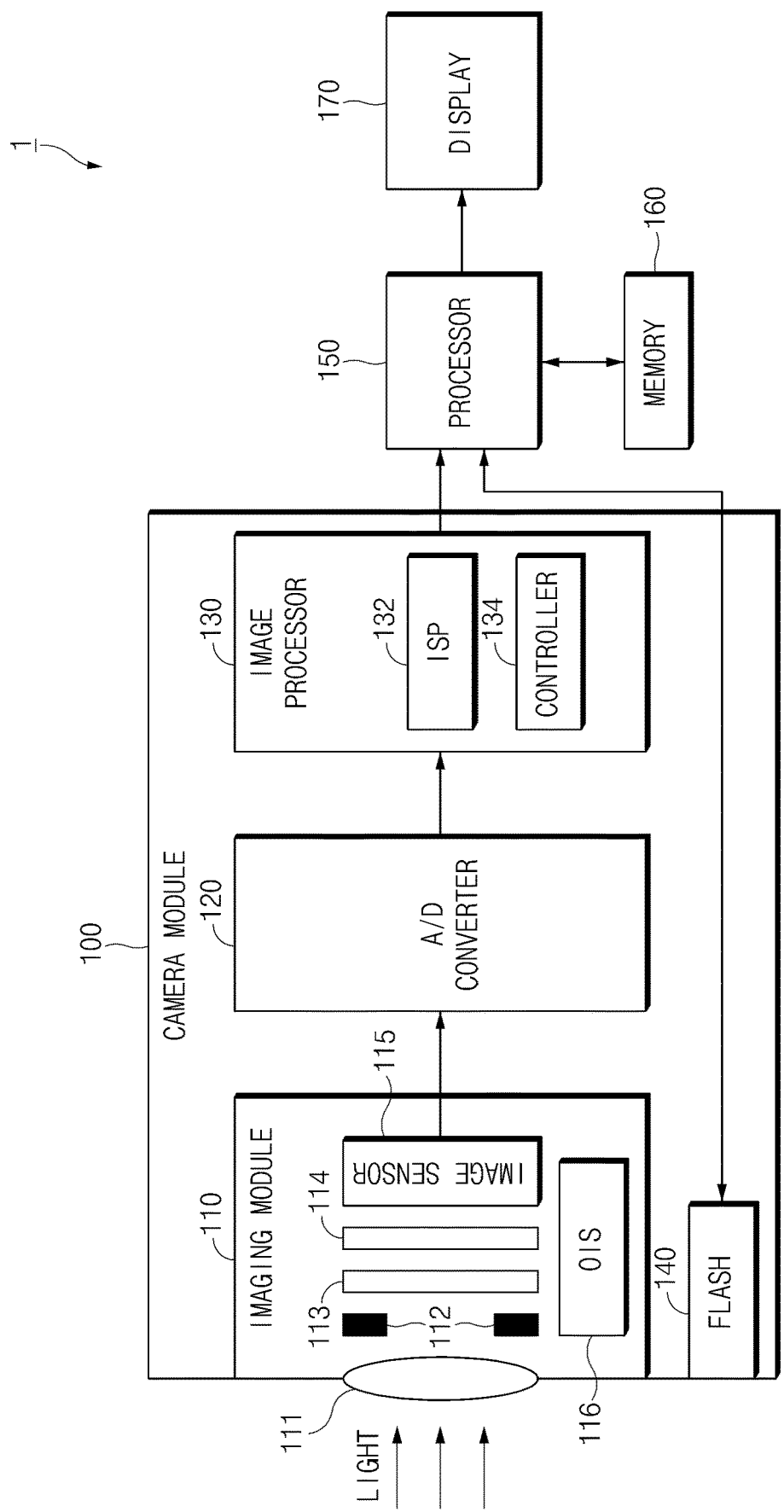
FIG. 1 illustrates an electronic device, according to an embodiment of the present disclosure.

Hereinafter, various embodiments of the present disclosure may be described with reference to accompanying drawings. Accordingly, those of ordinary skill in the art will recognize that modifications, equivalents, and/or alternatives of the various embodiments described herein can be made without departing from the scope and spirit of the present disclosure. With regard to description of drawings, similar elements may be marked by similar reference numerals.

In the present disclosure, the expressions "have", "may have", "include", "comprise", "may include", and "may comprise" used herein indicate existence of corresponding features (e.g., elements such as numeric values, functions, operations, or components) but do not exclude presence of additional features.

In the present disclosure, the expressions "A or B", "at least one of A and/or B", "one or more of A and/or B", etc. may include any and all combinations of one or more of the associated listed items. For example, the term "A or B", "at least one of A and B", or "at least one of A or B" may refer to all of the case 1 where at least one A is included, the case 2 where at least one B is included, or the case 3 where both of at least one A and at least one B are included.

Terms such as "first", "second", etc. used in the present disclosure may be used to refer to various elements regardless of the order and/or the priority, and to distinguish the relevant elements from other elements, but do not limit the elements. For example, "a first user device" and "a second user device" indicate different user devices regardless of the order or priority. For example, without departing from the scope of the present disclosure, a first element may be referred to as a second element, and similarly, a second element may be referred to as a first element.

It is understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

The expression "configured to" used in this disclosure may be used interchangeably with the expressions "suitable for", "having the capacity to", "designed to", "adapted to", "made to", or "capable of". The term "configured to" does not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor (AP)) which performs corresponding operations by executing one or more software programs which are stored in a memory device.

Terms used in the present disclosure are used to describe specific embodiments and are not intended to limit the scope of the present disclosure. The terms of a singular form may include plural forms unless otherwise specified. All the terms used herein, which include technical or scientific terms, may have the same meaning that is generally understood by a person skilled in the art. It is further understood that terms, which are defined in a dictionary and commonly used, should also be interpreted as is customary in the relevant related art and not in an idealized or overly formal unless expressly so defined in various embodiments of the present disclosure. In some cases, even if terms are terms which are defined in the present disclosure, they may not be interpreted to exclude embodiments of the present disclosure.

An electronic device according to various embodiments of the present disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), motion picture experts group (MPEG-1 or MPEG-2) audio layer 3 (MP3) players, mobile medical devices, cameras, or wearable devices. The wearable device may include at least one of an accessory type (e.g., watches, rings, bracelets, anklets, necklaces, glasses, contact lens, head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments of the present disclosure, the electronic device may be a home appliance. The home appliances may include at least one of, for example, televisions (TVs), digital versatile disc (DVD) players, audio players and recorders, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, etc.

According to an embodiment of the present disclosure, an electronic device may include at least one of various medical devices (e.g., portable medical measurement devices (e.g., a blood glucose monitoring device, a heartbeat measuring device, a blood pressure measuring device, a body temperature measuring device, etc.), a magnetic resonance angiography (MRA) device, a magnetic resonance imaging (MRI) device, a computed tomography (CT) device, scanners, and ultrasonic devices), navigation devices, global navigation satellite system (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller machines (ATMs), points of sales (POSs) devices, or Internet of things (IoT) devices (e.g., light bulbs, various sensors, electric or gas meters, sprinkler devices, fire alarms, thermostats, street lamps, toasters, exercise equipment, hot water tanks, heaters, boilers, etc.).

According to an embodiment of the present disclosure, the electronic device may include at least one of parts of furniture or buildings/structures, electronic boards, electronic signature receiving devices, projectors, or various measuring instruments (e.g., water meters, electricity meters, gas meters, wave meters, etc.). The electronic device may be one of the above-described devices or a combination thereof. An electronic device may be a flexible electronic device. Furthermore, an electronic device may not be limited to the above-described electronic devices and may include other electronic devices and new electronic devices according to the development of new technologies.

In the present disclosure, the term "user" may refer to a person who uses an electronic device or may refer to a device (e.g., an artificial intelligence electronic device) that uses the electronic device.

FIG. 1 illustrates an electronic device, according to an embodiment of the present disclosure.

Referring to FIG. 1, an electronic device 1 may include a camera module 100, a processor 150, a memory 160, and a display 170. The electronic device 1 may not include at least one of the above-described elements or may further include other element(s).

The camera module 100 may capture a still image and a moving picture. The camera module 100 may include an imaging module 110, an analog to digital converter (A/D converter) 120, an image processor 130, and a flash 140.

According to an embodiment of the present disclosure, the imaging module 110 may include an optical system of the camera module 100. The imaging module 110 may include a lens 111, a diaphragm 112, a quarter wave plate (or quarter wave retarder) 113, an infra-red cut filter 114, an image sensor 115, and an optical image stabilization (OIS) driving module 116.

The lens 111 may concentrate light incident thereto from the outside. The concentrated light may reach the image sensor 115 through various filters (e.g., quarter wave plate 113 and infra-red cut filter 114) via the diaphragm 112. For example, an optical image of a subject may be formed on an image plane of the image sensor 115 by the lens 111. According to various embodiments of the present disclosure, the lens 111 may be driven back and forth by a specified actuator for focusing on the subject.

The diaphragm 112 may adjust an amount (e.g., light intensity) of light reaching (or incident to) the image sensor 115. In general, as a diaphragm value is increased, the amount of light reaching the image sensor 115 is decreased. As a diaphragm value is decreased, the amount of light reaching the image sensor 115 is increased. According to an embodiment of the present disclosure, the value of the diaphragm 112 may be fixed.

The quarter wave plate 113 may convert light, which has passed through the diaphragm 112 after being concentrated on the lens 111, to circular polarized light. For example, in the case that the light (e.g., reflected light) has a linear polarization property, the quarter wave plate 113 may convert the light to circular polarized light. As the quarter wave plate 113 is inserted, incident light may be converted from linear polarized light to circular polarized light. In this case, stable sensitivity may be ensured regardless of a reflection manner from the subject.

The infra-red cut filter 114 may cut off an infrared wavelength of at least a portion of light incident from the outside. The spectrum region of an image sensor may be a visible ray region due to the infra-red cut filter 114. For example, the infra-red cut filter 114 may prevent excessive image exposure. According to an embodiment of the present disclosure, the infra-red cut filter 114 may not be used at night.

The image sensor 115 may include an array of pixels arranged in two dimensions (2D). The pixel array may include several millions to several tens of millions of pixels. The image sensor 115 may be implemented with, for example, a charge-coupled device (CCD) or a complementary metal-oxide-semiconductor (CMOS). The image sensor 115 may generate an electrical signal (e.g., the movement of charges, or a current) serving as a basis of the final image data in response to received light on the image sensor.

The OIS driving module 116 may dynamically adjust the position of the lens 111 or the position of the image sensor 115. Typically, the OIS driving module 116 may finely adjust the position of the lens 111 or the position of the image sensor 115 in a direction of cancelling the shaking of a user's hand holding the electronic device 1. Accordingly, image shaking, which is caused due to the shaking of the user's hand, may be corrected by the electronic device 1. According to various embodiments of the present disclosure, the OIS driving module 116 may be referred to as a vibration reduction (VR) module, an image stabilizer (IS) module, an optical stabilizer module, an anti-shake (AS) module, or a steady shot module according to the manufacturers of the electronic device 1.

The A/D converter 120 may convert an electrical analog signal, which is generated from the image sensor 115, into a digital signal. The A/D converter 120 may be contained within the image sensor 115.

The image processor 130 may process raw image data corresponding to the digital signal received from the A/D converter 120 in a specified manner. For example, the image processor 130 may process the raw image data in a pixel-by-pixel manner or a patch-by-patch manner. In addition, according to various embodiments of the present disclosure, the image processor 130 may be included in the processor 150 while functioning as an element of the processor 150.

According to an embodiment of the present disclosure, the image processor 130 may include an image signal processor (ISP) 132 and a controller 134 which controls the operation of the ISP 132.

The ISP 132 may include a plurality of image processing blocks (IP blocks). The ISP 132 may correct image data through the IP blocks under the control of the controller 134. The IP blocks are not limited thereto. The IP blocks may include various blocks such as an IP block for color interpolation, an IP block for lens shading correction, an IP block for auto white balance, an IP block for lateral chromatic aberration correction, an IP block for optical inverse correction, an IP block for noise reduction, an IP block for edge enhancement, an IP block for gamma correction, and an IP block for out of focusing or blurring. The IP blocks may be referred to as an image processing filter or an image processing module.

The flash 140 may include a light-emitting diode (LED) or a xenon lamp. The flash 140 may automatically or manually operate when an amount of light reflected from the subject or generated from the subject is not sufficient to create an image of desired quality.

The processor 150 may be electrically connected with elements included in the electronic device 1 and may execute arithmetic operations or data processing associated with control and/or communication of the elements included in the electronic device 1.

The memory 160 may include a volatile and/or a non-volatile memory. The memory 160 may store instructions or data associated with at least one other component(s) of the electronic device 1. The memory 160 may store image data files serving as the final results processed in the image processor 130.

The display 170 may include, for example, a liquid crystal display (LCD), a LED display, an organic LED (OLED) display, a microelectromechanical systems (MEMS) display, or an electronic paper display. The display 170 may display, for example, image data (e.g., live view), a still image, a moving picture, etc., which is received from the camera module 100 in real time.

Figure 2:
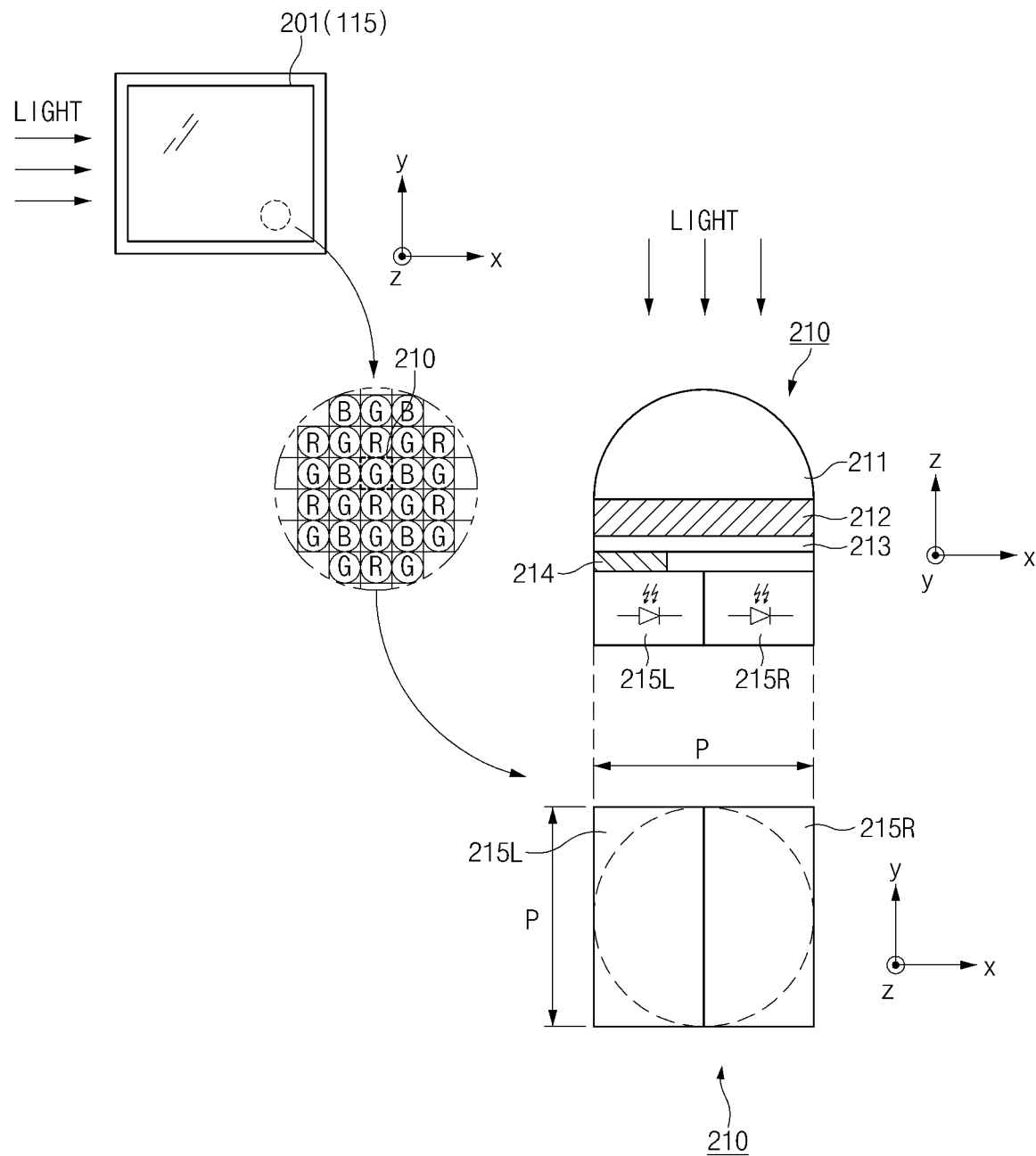
FIG. 2 illustrates a configuration of an image sensor, according to an embodiment of the present disclosure.

FIG. 2 illustrates the configuration of an image sensor, according to an embodiment of the present disclosure.

Referring to FIG. 2, an image sensor 201 may include an array of pixels (e.g., several millions to several tens of millions of pixels). The pixels may include, for example, several hundreds to several thousands of pixels arranged in an x axis direction (e.g., horizontal direction) and, similarly, may include several hundreds to several of thousands pixels arranged in a Y axis direction (e.g., vertical direction). For example, the image sensor 201 may correspond to the image sensor 115.

According to an embodiment of the present disclosure, a pixel 210 may include a micro-lens 211, various films or filters 212 to 214, a first photoelectric conversion device 215L, and a second photoelectric conversion device 215R. The pixel 210 may additionally include other elements, such as various conductive patterns, to electrically connect the first and second photoelectric conversion devices 215L and 215R with an image processor. The pixel 210 may have the shape of a square having a pitch of p (e.g., about 1 μm) when viewed in the z axis direction.

The micro-lens 211 may concentrate incident light such that the incident light reaches the first photoelectric conversion device 215L and the second photoelectric conversion device 215R. As the incident light is refracted by the micro-lens, a light concentrating spot (e.g., an optical spot) may be formed on the first photoelectric conversion device 215L and the second photoelectric conversion device 215R.

The color filter 212 may be disposed under the micro-lens 211 and may pass light having a specific color, that is, light having a specific wavelength range. For example, the color filter 212 may correspond to a primary color filter (e.g., Red, Green, or Blue (R, G, B)) or a complementary color filter (e.g., magenta (Mg), yellow (Ye), green (G), or cyan (Cy)).

The anti-reflective film 213 may prevent light incident thereto through the micro-lens 211 from being reflected, thereby increasing the amount of light reaching the first photoelectric conversion device 215L and the second photoelectric conversion device 215R.

The mask 214 may block light passing through the micro-lens 211, the color filter 212, and the anti-reflective film 213. The mask 214 may occupy a partial area of the pixel 210. Mask 214 may be provided only in some of the pixels included in the image sensor 201. In other words, the masks 214 may be omitted from most of the pixels.

The first photoelectric conversion device 215L and the second photoelectric conversion device 215R may, for example, correspond to photodiodes formed on a semiconductor substrate. The first photoelectric conversion device 215L and the second photoelectric conversion device 215R may output electrical signals in response to the incident light due to the photoelectric effect. For example, the first photoelectric conversion device 215L and the second photoelectric conversion device 215R may produce charges (or current) according to the intensity (or an amount) of received light. An output value may be determined depending on an amount of charges (or current). According to various embodiments of the present disclosure, the first and second photoelectric conversion devices 215L and 215R may be referred to as an imaging devices.

Although only two photoelectric conversion devices 215L and 215R are taught in the pixel 210, the present disclosure is not limited thereto. For example, the pixel 210 may include a single photoelectric conversion device or at least three photoelectric conversion devices. In this case, a pixel having at least two photoelectric conversion devices may be referred to as a multi-pixel, and a pixel having two photoelectric conversion devices may be referred to as a dual pixel.

FIG. 3A illustrates the pixel array of the image sensor, according to an embodiment of the present disclosure.

Referring to FIG. 3A, an image sensor 301 may include a first pixel 311R having a first color filter passing light having a first wavelength range, second pixels 311Gr and 311Gb having second color filters passing light having a second wavelength range, and a third pixel 311B having a third color filter passing light having a third wavelength range. In this case, the first wavelength range may be designed to be longer than the second wavelength range, and the second wavelength range may be designed to be longer than the third wavelength range (that is, first wavelength range>second wavelength range>third wavelength range).

The pixels 311R, 311Gr, 311Gb, and 311B may be repeatedly arranged in a 2D array in the image sensor 301. According to an embodiment of the present disclosure, the set of the first pixel 311R may be referred to as a first group of pixels. Similarly, the set of second pixels 311Gr and 311Gb may be referred to as a second group of pixels and the set of third pixels 311B may be referred to as a third group of pixels.

The pixels in each group provided in the image sensor 301 may be arranged in a Bayer pattern. Accordingly, the first wavelength range may correspond to red light, the second wavelength range may correspond to green light, and the third wavelength range may correspond to blue light. In addition, the number of pixels in the second group of pixels may be twice as large as the number of pixels in the first group of pixels or the number of pixels in the third group of pixels in the image sensor 301.

According to an embodiment of the present disclosure, in the image sensor 301, the second pixels 311Gr and 311Gb, and the third pixel 311B may include a plurality of photoelectric conversion devices. In the case of the second pixels 311Gr and 311Gb and the third pixel 311B, an exit pupil may be split due to the optical position relation between the photoelectric conversion devices. Although the second pixels 311Gr and 311Gb, and the third pixel 311B may include two photoelectric conversion devices in the case of the image sensor 301, the present disclosure is not limited thereto. The second pixels 311Gr and 311Gb, and the third pixel 311B may include at least three photoelectric conversion devices.

In the case of the second pixels 311Gr and 311Gb, and the third pixel 311B, the light receiving areas of a plurality of photoelectric conversion devices may be equal to each other. In other words, as illustrated in FIG. 3A, in the case of the second pixels 311Gr and 311Gb, and the third pixel 311B, light receiving regions of two photoelectric conversion devices may have rectangular shapes and the light receiving regions may have equal areas.

According to an embodiment of the present disclosure, in the case of the image sensor 301, the first pixel 311R may include a single photoelectric conversion device. Since the first pixel 311R includes a single photoelectric conversion device having a pitch of about 1 μm, the first pixel 311R may receive red light having the wavelength of about 700 nm with higher sensitivity regardless of the polarization direction of the red light.

The image sensor 302 may include a first pixel 312R having a first color filter passing light having a first wavelength range, second pixels 312Gr and 312Gb having second color filters passing light having a second wavelength range, and a third pixel 312B having a third color filter passing light having a third wavelength range.

Since the first pixel 312R, the second pixels 312Gr and 312Gb, and the third pixel 312B correspond to the first pixel 311R, the second pixels 311Gr and 311Gb, and the third pixel 311B, respectively, the redundant details thereof will be omitted.

According to an embodiment of the present disclosure, some pixels in the first group of pixels including the first pixel 312R may include masks to block a portion of light passing through the first color filter. For example, the light receiving regions of the first pixel 312R may partially be restricted by the mask. In addition, the light receiving region (that is, a region occupied by the photoelectric conversion device) of the first pixel 312R may be disposed eccentrically from the center of a micro-lens of the first pixel 312R. Accordingly, the exit pupil may be partially restricted.

In the case of the image sensor 302, all pixels in the first group of pixels including the first pixel 312R include masks. According to various embodiments of the present disclosure, most pixels in the first group of pixels provided in the image sensor 302 may not include the mask. A pixel, which (e.g., the first pixel 312R) has the mask, in the first group of pixels, may be used to, for example, detect a phase difference for optical focusing.

According to various embodiments of the present disclosure, the patterns of the pixel arrays of the image sensor 301 and 302 may not be limited to the Bayer pattern. For example, the image sensor 301 or 302 may have a CYYM (cyan, yellow, yellow, magenta) pattern. In the case of the CYYM pattern, light passing through the first color filter of the first pixel may correspond to magenta light, and light passing through the second color filter of the second pixel may correspond to yellow light. In addition, light passing through the third color filter of the third pixel may correspond to cyan light. In other words, the first color filter may pass at least a portion of light having the first wavelength range R and at least a portion of light having the third wavelength range B. The second color filter may pass at least a portion of light having the first wavelength range R and at least a portion of light having the second wavelength range G. The third color filter may pass a portion of light having the second wavelength range G and at least a portion of light having the third wavelength range B.

Figure 3B:
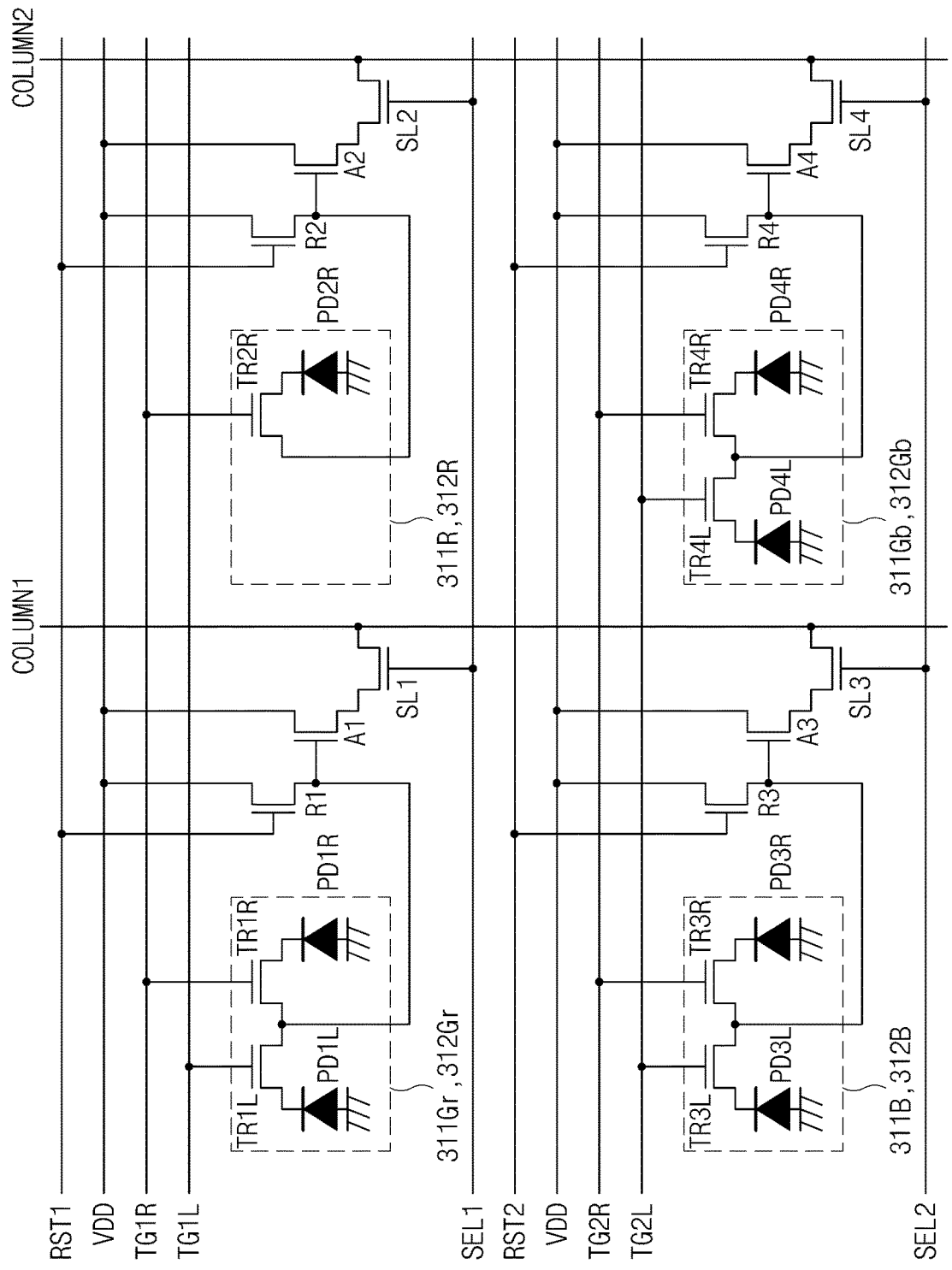
FIG. 3B illustrates a circuit configuration of a pixel array, according to an embodiment of the present disclosure.

FIG. 3B illustrates a circuit configuration of the pixel array, according to an embodiment of the present disclosure.

FIG. 3B illustrates the circuit configuration of the pixel array included in the image sensors 301 and 302. Each of the second pixel 311Gr or 312Gr, the second pixel 311Gb or 312Gb, and the third pixel 311B or 312B may include two photoelectric conversion devices (e.g., photodiodes). The first pixels 311R or 312R may include one photoelectric conversion device. The pixels may share control lines, such as lines RST1, RST2, TG1L, TG1R, TG2L, TG2R, SEL1, SEL2, and VDD together in a horizontal direction and may share output lines COLUMN1 and COLUMN2 together in a vertical direction.

In the second pixels 311Gr and 312Gr, two photodiodes PD1L and PD1R may be connected to source terminals of the two transistors TR1L and TR1R, respectively. Gate terminals of the transistors TR1L and TR1R may be connected to lines TG1L and TG1R, respectively. A drain terminal of the transistor TR1L may be connected with a drain terminal of the transistor TR1R. A node that the drain terminal of the transistor TR1L is connected with the drain terminal of the transistor TR1R may be connected with a drain terminal of a transistor R1 and a gate terminal of a transistor A1. A gate terminal of the transistor R1 may be connected to the line RST1, and a source terminal of the transistor R1 may be connected to the line VDD. A source terminal of the transistor A1 may be connected to the line VDD, and a drain terminal of the transistor A1 may be connected to a source terminal of a transistor SL1. A gate terminal of the transistor SL1 may be connected to the line SEL1, and a drain terminal of the transistor SL1 may be connected to the line COLUMN1.

The second pixels 311Gb and 312Gb and the third pixels 311B and 312B may have the configurations and the connection relation similar to those of the second pixels 311Gr and 312Gr as illustrated in FIG. 3B.

In each of the first pixels 311R and 312R including a single photodiode PD2R, the photodiode PD2R may be connected to a source terminal of a transistor TR2R. A gate terminal of the transistor TR2R may be connected to the line TG1R, and a drain terminal of the transistor TR2R may be connected with a drain terminal of a transistor R2 and a gate terminal of the transistor A2. A gate terminal of the transistor R2 may be connected to the line RST1, and a source terminal of the transistor R2 may be connected to the line VDD. A source terminal of the transistor A2 may be connected to the line VDD, and the drain terminal of the transistor A2 may be connected to a source terminal of a transistor SL2. A gate terminal of the transistor SL2 may be connected to the line SEL1, and a drain terminal of the transistor SL2 may be connected to the line COLUMN2.

Figure 4A:
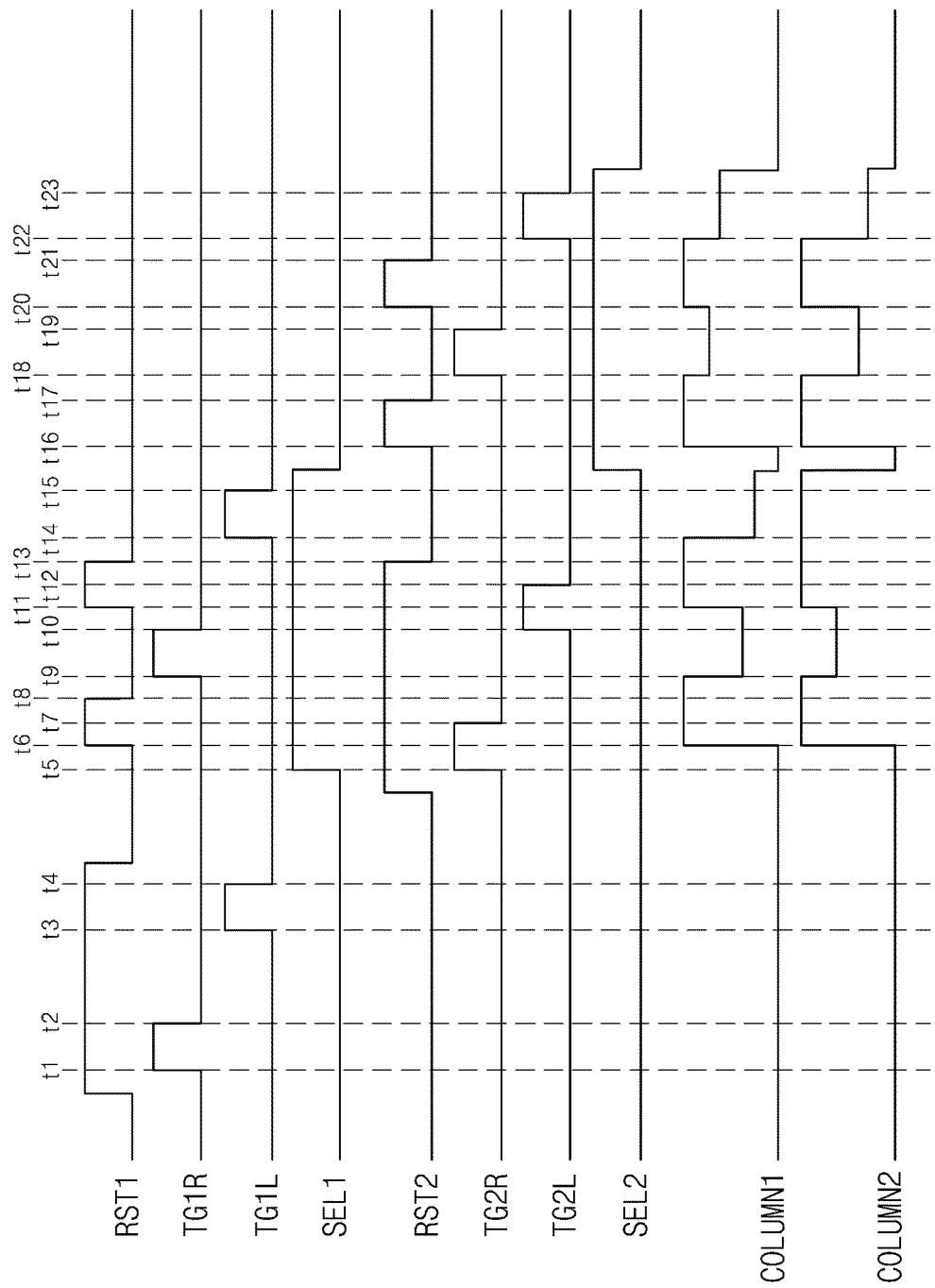
FIGS. 4A and 4B are timing diagrams illustrating the operations of a control line and an output line, according to an embodiment of the present disclosure.
Figure 4B:
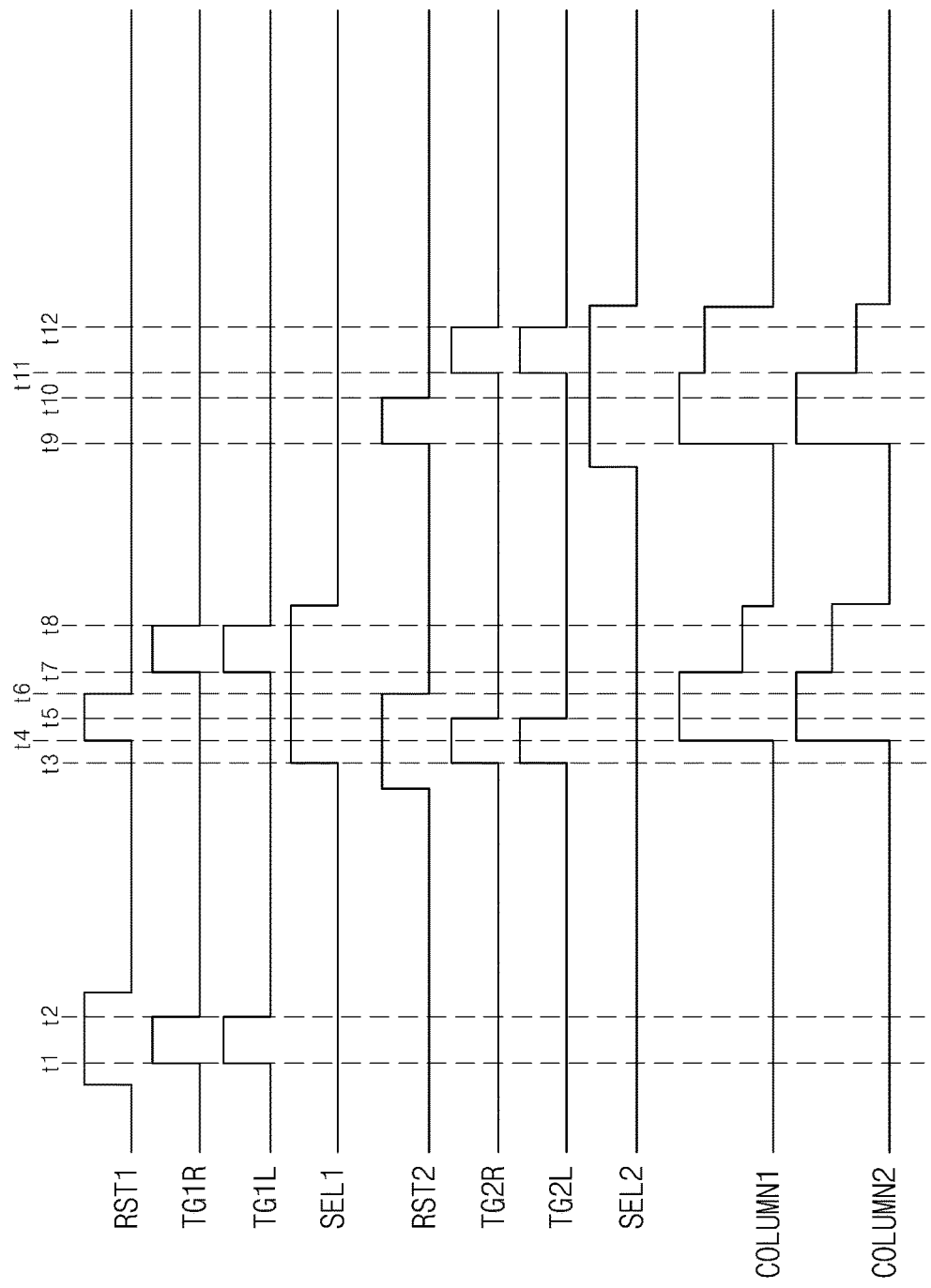

FIGS. 4A and 4B are timing diagrams illustrating the operations of the control line and the output line, according to an embodiment of the present disclosure.

FIG. 4A illustrates the operations of the control line and the output line in the circuit configuration of the pixel array illustrated in FIG. 3B. The timing diagram illustrated in FIG. 4A represents the case of individually reading output values from two photodiodes. The operation according to the timing diagram may be, for example, performed by a circuit which drives the image sensor. In FIG. 4A, the reference numerals of FIG. 3B will be used.

Referring to FIG. 4A, the photodiodes PD1R and PD2R may be initialized at t1 and the photodiode PD1L may be initialized at t3. Thereafter, signals may be output from the photodiodes PD1R and PD2R at t9, and a signal may be output from the photodiode PD1L at t14. To perform a correlated double sampling (CDS) operation to help reduce the noise from the signals output from the pixels in a next operation, a reset level may be output at t6 and t11 before the signals are output. If the output of the signal from the photodiode PD1L is terminated, signals are output from the photodiodes PD3R and PD4R at t18, and signals may be output from the photodiodes PD3L and PD4L at t22. Initialization is performed even for the photodiodes PD3L and PD4L in advance at t5 and t10, and a reset level may be output to perform the CDS processing at t16 and t20. In this case, the photodiodes PD1R and PD2R may be exposed for the duration of t2 to t10, and the photodiode PD1L may be exposed for the duration of t4 to t15.

FIG. 4B illustrates the operations of the control line and the output line in the circuit configuration of the pixel array illustrated in FIG. 3B. The timing diagram illustrated in FIG. 4B represents the case of simultaneously reading output values from two photodiodes. The operation according to the timing diagram may be, performed by a circuit which drives the image sensor. In FIG. 4B, the reference numerals of FIG. 3B will be used.

Referring to FIG. 4B, the photodiodes PD1R, PD1L, and PD2R are simultaneously initialized at t1, and signals may be simultaneously output from the photodiodes PD1R, PD1L, and PD2R at t7. Since charges are simultaneously output from the photodiodes PD1R and PD1L, charges are added at a relevant output time point. To perform the CDS operation for signals output from the pixels in a next operation, a reset level may be output at t4 before the signals are output. If the output of the signal from the photodiodes PD1R, PD1L, PD2R is terminated, signals are output from the photodiodes PD3R, PD3L, PD4R, and PD4L at t11. Even in this case, due to the simultaneously output of the signals, the adding of charges of the photodiodes PD3R and PD3L, and the adding of charges of the photodiodes PD4R and PD4L are performed. Initialization is performed even for the photodiodes PD3R, PD3L, PD4R, and PD4L at t3, and a reset level may be output to perform the CDS processing at t9. The photodiodes PD1R, PD1L, and PD2R are exposed for the duration of t2 to t8 and the photodiodes PD3R, PD3L, PD4R, and PD4L are exposed for the duration of t5 to t12. Since charges are simultaneously output from left and right photodiodes, the difference in exposure time between the photodiodes may not be occurred.

Figure 5A:
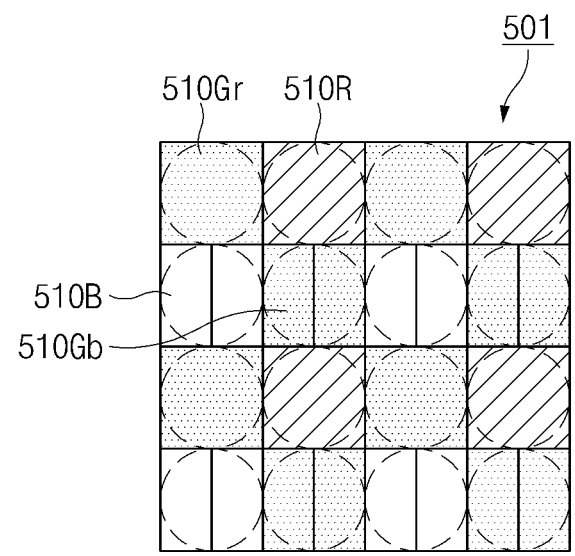
FIG. 5A illustrates a pixel array of an image sensor, according to an embodiment of the present disclosure.

FIG. 5A illustrates a pixel array of the image sensor, according to an embodiment of the present disclosure.

Referring to FIG. 5A, the image sensor 501 may include a first pixel 510R having a first color filter passing light having a first wavelength range, second pixels 510Gr and 510Gb having second color filters passing light having a second wavelength range, and a third pixel 510B having a third color filter passing light having a third wavelength range. In this case, the first wavelength range may be designed to be longer than the second wavelength range, and the second wavelength range may be designed to be longer than the third wavelength range (that is, first wavelength range>second wavelength range>third wavelength range).

A first group of pixels including the first pixel 510R, a second group of pixels including the second pixels 510Gr and 510Gb, and a third group of pixels including the third pixel 510B may be arranged in a Bayer pattern. Accordingly, the first wavelength range may correspond to red light, the second wavelength range may correspond to green light, and the third wavelength range may correspond to blue light.

According to an embodiment of the present disclosure, in the image sensor 501 some pixels included in the second group of pixels may include two photoelectric conversion devices. In addition, each of other pixels included in the second group of pixels may include one photoelectric conversion device. For example, the second pixel 510Gr included in the second group of pixels may include a single photoelectric conversion device. The second pixel 510Gb included in the second group of pixels may include two photoelectric conversion devices. In addition, the first pixel 510R may include a single photoelectric conversion device, and the third pixel 510B may include two photoelectric conversion devices. In the case of the second pixels 510Gb and the third pixel 510B including two photoelectric conversion devices, an exit pupil may be split due to the optical position relation between the photoelectric conversion devices.

In the image sensor 501, the first pixel 510R and the second pixel 510Gr may include a single photoelectric conversion device. Since the first pixel 510R and the second pixel 510Gr include a single photoelectric conversion device, the first pixel 510R and the second pixel 510Gr may receive light having the associated color with higher sensitivity.

Figure 5B:
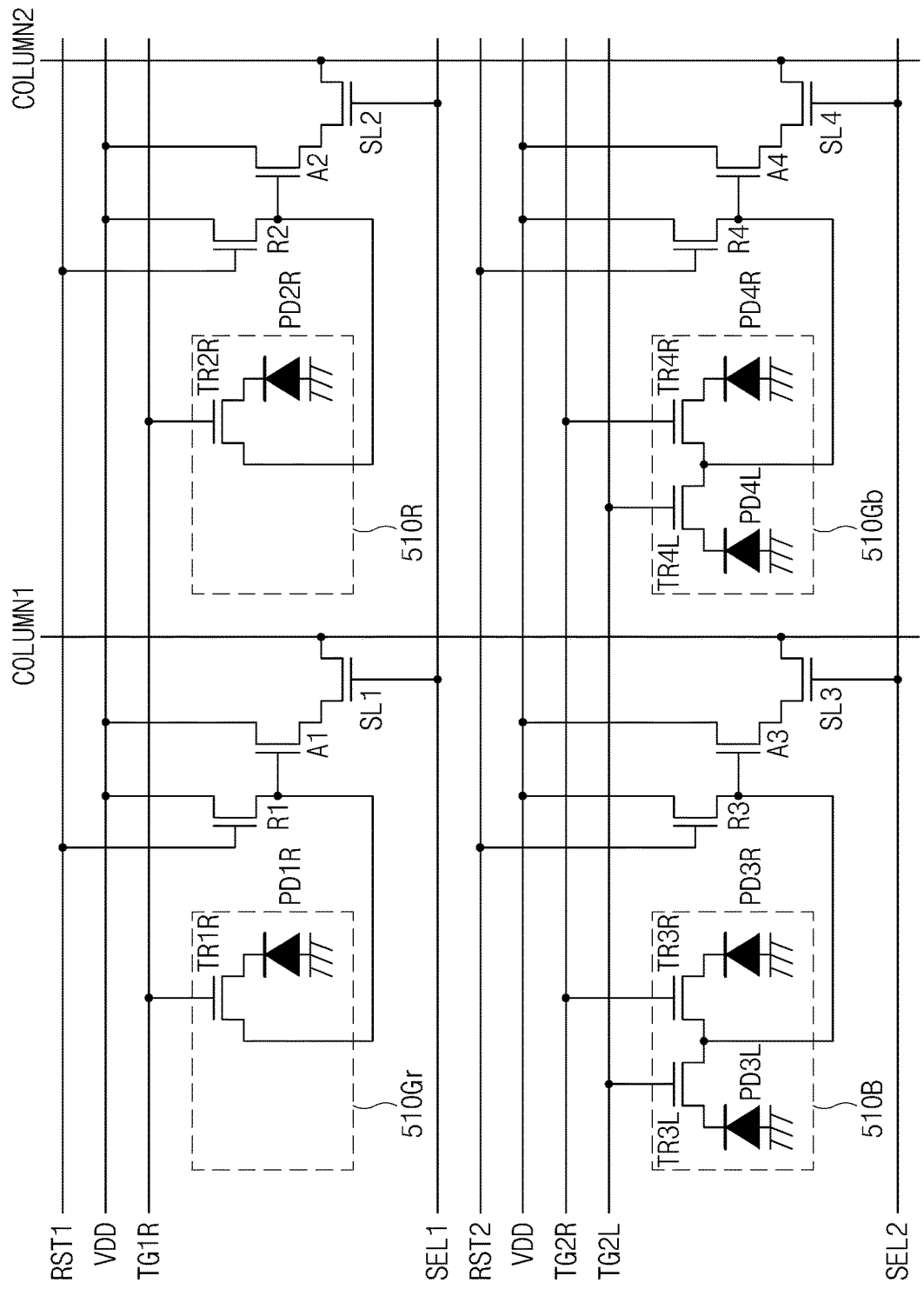
FIG. 5B illustrates a circuit configuration of a pixel array, according to an embodiment of the present disclosure.

FIG. 5B illustrates a circuit configuration of a pixel array, according to an embodiment of the present disclosure.

FIG. 5B illustrates, the circuit configuration of pixel arrays included in the image sensor 501. Each of the second pixel 510Gb and the third pixel 510B may include two photoelectric conversion devices (e.g., photodiodes). The first pixel 510R and the second pixel 510Gr may include one photoelectric conversion device. The pixels may share control lines, such as lines RST1, RST2, TG1R, TG2L, TG2R, SEL1, SEL2, and VDD together in a horizontal direction and may share output lines COLUMN1 and COLUMN2 together in a vertical direction.

In the second pixel 510Gr, one photodiode PD1R may be connected to a source terminal of a transistor TR1R. A gate terminal of the transistor TR1R may be connected to the line TG1R, and a drain terminal of the transistor TR1R may be connected with a drain terminal of a transistor R1 and a gate terminal of a transistor A1. A gate terminal of the transistor R1 may be connected to the line RST1, and a source terminal of the transistor R1 may be connected to the line VDD. A source terminal of the transistor A1 may be connected to the line VDD, and a drain terminal of the transistor A1 may be connected to a source terminal of a transistor SL1. A gate terminal of the transistor SL1 may be connected to a line SEL1, and a drain terminal of the transistor SL1 may be connected to the line COLUMN1.

The first pixel 510R including a single photodiode may have the configurations and the connection relation similar to those of the second pixel 510Gr as illustrated in FIG. 5B.

In the second pixel 510Gb, two photodiodes PD4L and PD4R may be connected to source terminals of two transistors TR4L and TR4R, respectively. Gate terminals of the transistors TR4L and TR4R may be connected to lines TG2L and TG2R, respectively. A drain terminal of the transistor TR4L may be connected with a drain terminal of the transistor TR4R. A node that the drain terminal of the transistor TR4L is connected with the drain terminal of the transistor TR4R may be connected with a drain terminal of a transistor R4 and a gate terminal of a transistor A4. A gate terminal of the transistor R4 may be connected to the line RST2, and a source terminal of the transistor R4 may be connected to the line VDD. A source terminal of the transistor A4 may be connected to the line VDD, and the drain terminal of the transistor A4 may be connected to a source terminal of a transistor SL4. A gate terminal of the transistor SL4 may be connected to the line SEL2, and a drain terminal of the transistor SL4 may be connected to a COLUMN2 line.

The third pixel 510B including two photodiodes may have the configurations and the connection relation similar to those of the second pixel 510Gb as illustrated in FIG. 5B.

Figure 6A:
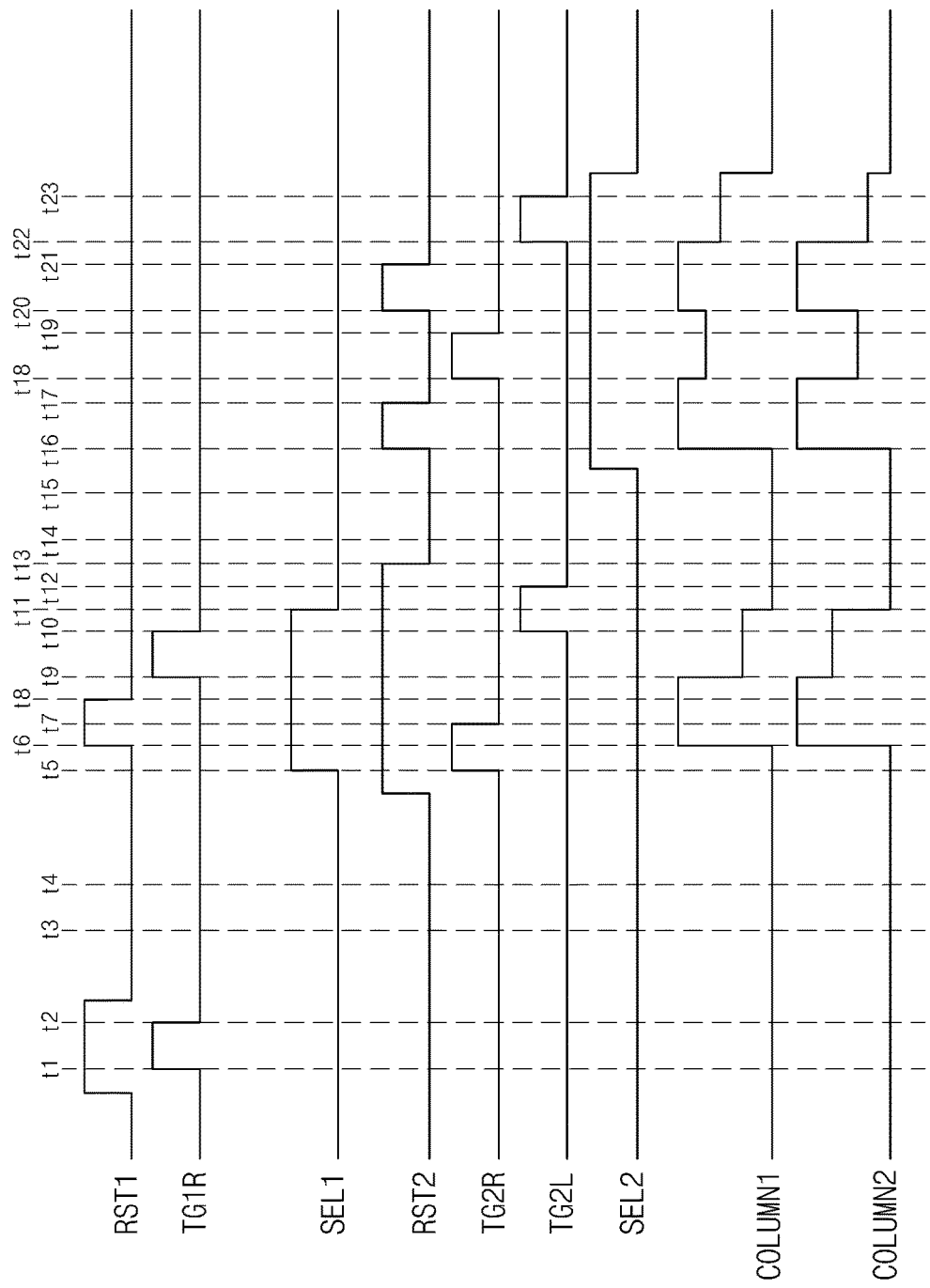

FIGS. 6A and 6B are timing diagrams illustrating the operations of the control line and the output line, according to an embodiment of the present disclosure.

FIG. 6A illustrates the operations of the control line and the output line in the circuit configuration of the pixel array illustrated in FIG. 5B. The timing diagram illustrated in FIG. 6A represents the case of individually reading output values from two photodiodes. The operation according to the timing diagram may be performed by a circuit which drives the image sensor. In FIG. 6A, the reference numerals of FIG. 5B will be used.

Referring to FIG. 6A, the photodiodes PD1R and PD2R may be initialized at t1. Thereafter, signals may be output from the photodiodes PD1R and PD2R at t9. To perform the CDS operation for signals output from the photodiodes in a next operation, a reset level may be output at t6 and t11 before the signals are output. If the output of the signals from the photodiodes PD1R and PD2R is terminated, signals are output from the photodiodes PD3R and PD4R at t18, and signals may be output from the photodiodes PD3L and PD4L at t22. Initialization is performed even for the photodiodes PD3R and PD4R at t5 and t10 in advance, and a reset level may be output to perform the CDS processing at t16 and t20. In this case, the photodiodes PD1R and PD2R are exposed for the duration of t2 to t10.

FIG. 6B illustrates the operations of the control line and the output line in the circuit configuration of the pixel array illustrated in FIG. 5B. The timing diagram illustrated in FIG. 6B represents the case of simultaneously reading output values from two photodiodes. The operation according to the timing diagram may be performed by a circuit which drives the image sensor. In FIG. 6B, the reference numerals of FIG. 5B will be used.

Referring to FIG. 6B, the photodiodes PD1R and PD2R are simultaneously initialized at t1, and signals may be simultaneously output from the photodiodes PD1R and PD2R at t7. To perform the CDS operation for signals output from the pixels in a next operation, a reset level may be output at t4 before the signals are output. If the output of the signals from the photodiodes PD1R and PD2R is terminated, signals are output from the photodiodes PD3R, PD3L, PD4R, and PD4L at t11. In this case, due to the simultaneously output of the signals, the adding of charges of the photodiodes PD3R and PD3L and the adding of charges of the photodiodes PD4R and PD4L are performed. Even in this case, the initialization of the photodiodes is performed in advance at t3 and the reset level is output to perform the CDS processing at t9. The photodiodes PD1R and PD2R may be exposed for the duration of t2 to t8, and the photodiodes PD3R, PD3L, PD4R, and PD4L may be exposed for the duration of t5 to t12. Since charges are simultaneously output from the left and right photodiodes, the difference in exposure time between the photodiodes may not be occurred.

Figure 7A:
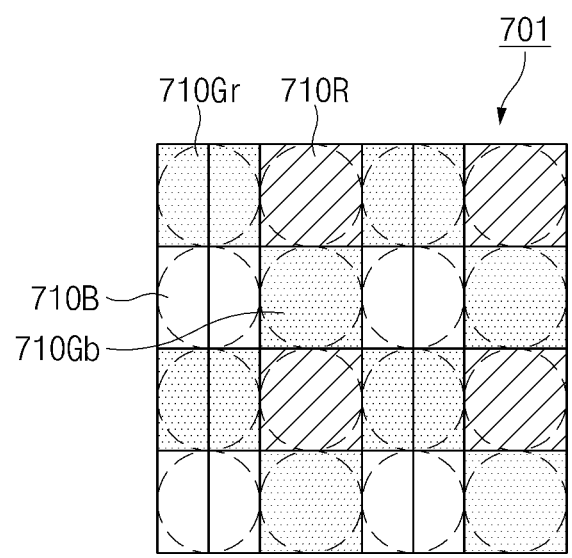
FIG. 7A illustrates a pixel array of the image sensor, according to an embodiment of the present disclosure.

FIG. 7A illustrates a pixel array of the image sensor, according to an embodiment of the present disclosure.

Referring to FIG. 7A, the image sensor 701 may include a first pixel 710R having a first color filter passing light having a first wavelength range, second pixels 710Gr and 710Gb having second color filters passing light having a second wavelength range, and a third pixel 710B having a third color filter passing light having a third wavelength range. In this case, the first wavelength range may be designed to be longer than the second wavelength range, and the second wavelength range may be designed to be longer than the third wavelength range (that is, first wavelength range>second wavelength range>third wavelength range).

A first group of pixels including the first pixel 710R, a second group of pixels including the second pixels 710Gr and 710Gb, and a third group of pixels including the third pixel 710B may be arranged in a Bayer pattern. Accordingly, the first wavelength range may correspond to red light, the second wavelength range may correspond to green light, and the third wavelength range may correspond to blue light.

According to an embodiment of the present disclosure, in the image sensor 701, some pixels included in the second group of pixels may include two photoelectric conversion devices. In addition, each of other pixels included in the second group of pixels may include one photoelectric conversion device. For example, the second pixel 710Gr included in the second group of pixels may include two photoelectric conversion devices. The second pixel 710Gb included in the second group of pixels may include a single photoelectric conversion device. In addition, the first pixel 710R may include a single photoelectric conversion device, and the third pixel 710B may include two photoelectric conversion devices. In the case of the second pixels 710Gr and the third pixel 710B including two photoelectric conversion devices, an exit pupil may be split due to the optical position relation between the photoelectric conversion devices.

In the image sensor 701, the first pixel 710R and the second pixel 710Gb may include a single photoelectric conversion device. Since the first pixel 710R and the second pixel 710Gb include a single photoelectric conversion device, the first pixel 710R and the second pixel 710Gb may receive light having the associated color with higher sensitivity.

Figure 7B:
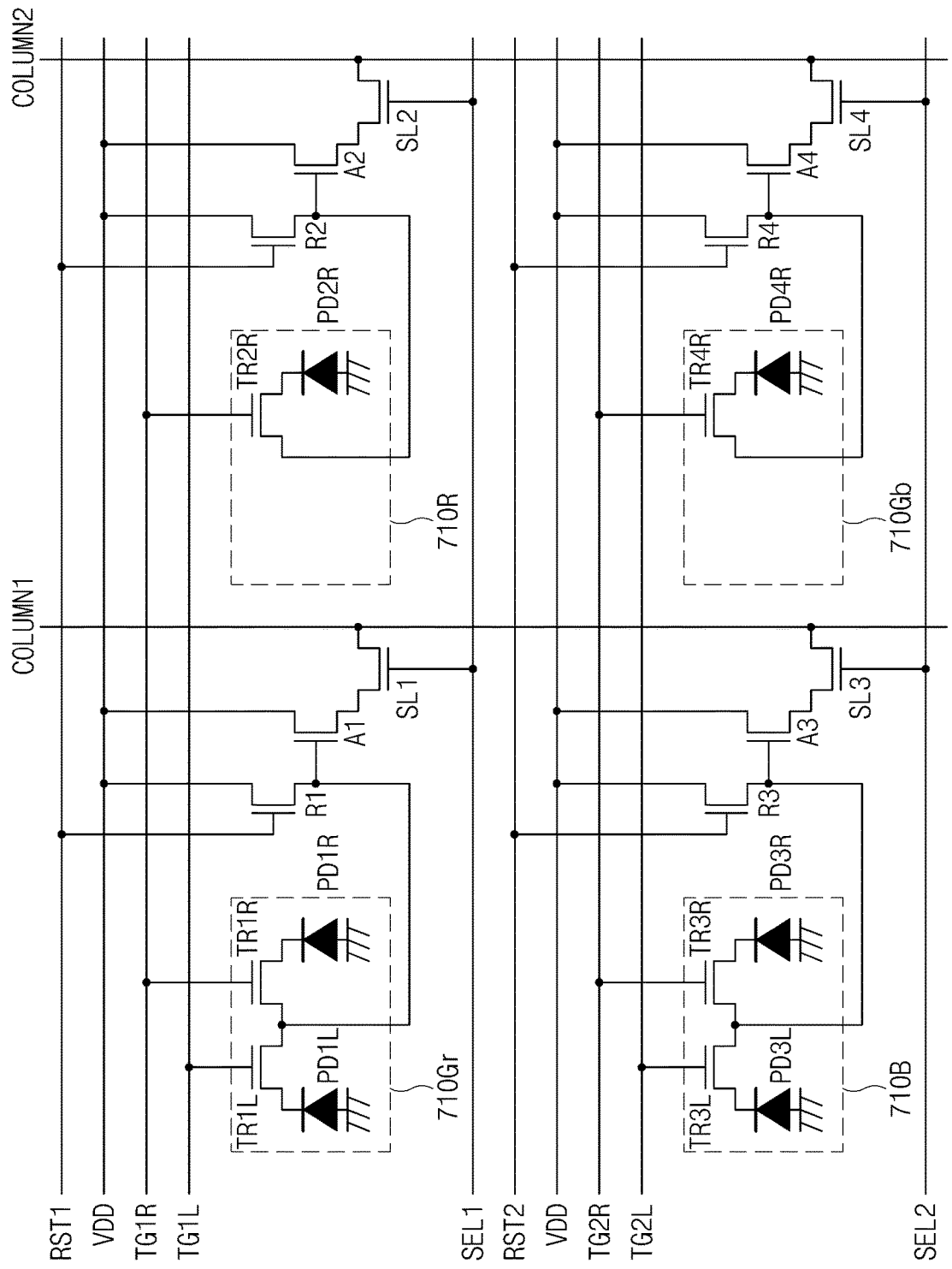
FIG. 7B illustrates a circuit configuration of a pixel array, according to an embodiment of the present disclosure.

FIG. 7B illustrates a circuit configuration of a pixel array, according to an embodiment of the present disclosure.

FIG. 7B illustrates the circuit configuration of pixel arrays included in the image sensor 701. According to an embodiment of the present disclosure, in the image sensor 701, each of the second pixel 710Gr and the third pixel 710B may include two photoelectric conversion devices (e.g., photodiodes). Meanwhile, the first pixel 710R and the second pixel 710Gb may include one photoelectric conversion device. The pixels may share control lines, such as lines RST1, RST2 TG1L, TG1R, TG2L, TG2R, SEL1, SEL2, and VDD together in a horizontal direction and may share output lines COLUMN1 and COLUMN2 together in a vertical direction.

Figure 8A:
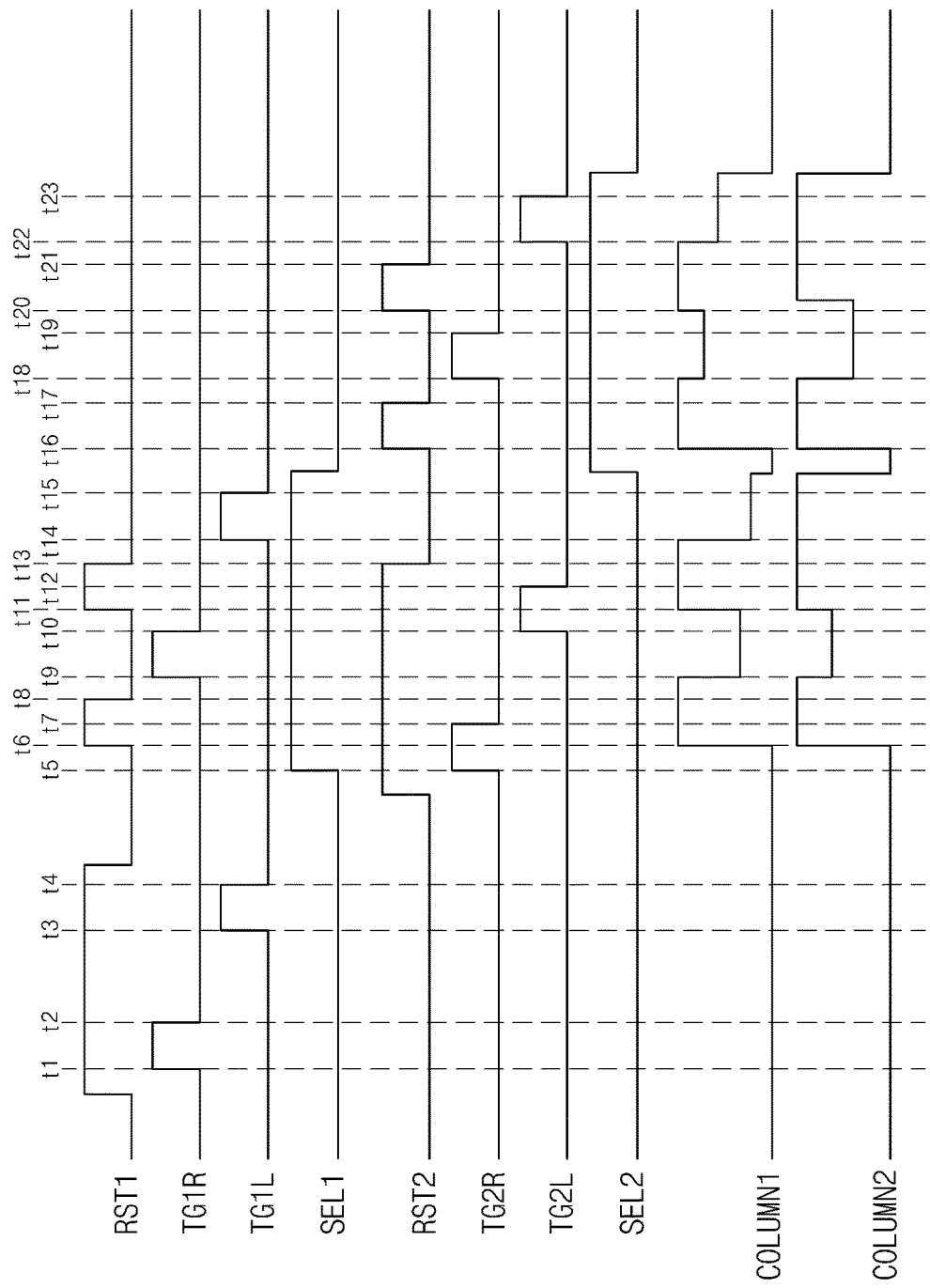
FIGS. 8A and 8B are timing diagrams illustrating the operations of a control line and an output line, according to an embodiment of the present disclosure.

Referring to FIG. 8A, in the second pixel 710Gr, two photodiodes PD1L and PD1R may be connected to source terminals of two transistors TR1L and TR1R, respectively. Gate terminals of the transistors TR1L and TR1R may be connected to lines TG1L and TG1R, respectively. A drain terminal of the transistor TR1L may be connected with a drain terminal of the transistor TR1R. A node that the drain terminal of the transistor TR1L is connected with the drain terminal of the transistor TR1R may be connected with a drain terminal of a transistor R1 and a gate terminal of a transistor A1. A gate terminal of the transistor R1 may be connected to a line RST1, and a source terminal of the transistor R1 may be connected to the line VDD. A source terminal of the transistor A1 may be connected to the line VDD, and a drain terminal of the transistor A1 may be connected to a source terminal of a transistor SL1. A gate terminal of the transistor SL1 may be connected to a line SEL1, and a drain terminal of the transistor SL1 may be connected to the line COLUMN1.

The third pixel 710B including two photodiodes may have the configurations and the connection relation similar to those of the second pixel 710Gr as illustrated in FIG. 7B.

In the second pixel 710Gb, one photodiode PD4R may be connected to a source terminal of a transistor TR4R. A gate terminal of the transistor TR4R may be connected to the line TG2R, and a drain terminal of the transistor TR4R may be connected with a drain terminal of a transistor R4 and a gate terminal of the transistor A4. A gate terminal of the transistor R4 may be connected to the line RST2, and a source terminal of the transistor R4 may be connected to the line VDD. A source terminal of the transistor A4 may be connected to the line VDD, and the drain terminal of the transistor A4 may be connected to a source terminal of a transistor SL4. A gate terminal of the transistor SL4 may be connected to the line SEL2, and a drain terminal of the transistor SL4 may be connected to the line COLUMN2.

The first pixel 710R including a single photodiode may have the configurations and the connection relation similar to those of the second pixel 710Gb as illustrated in FIG. 7B.

Figure 8B:
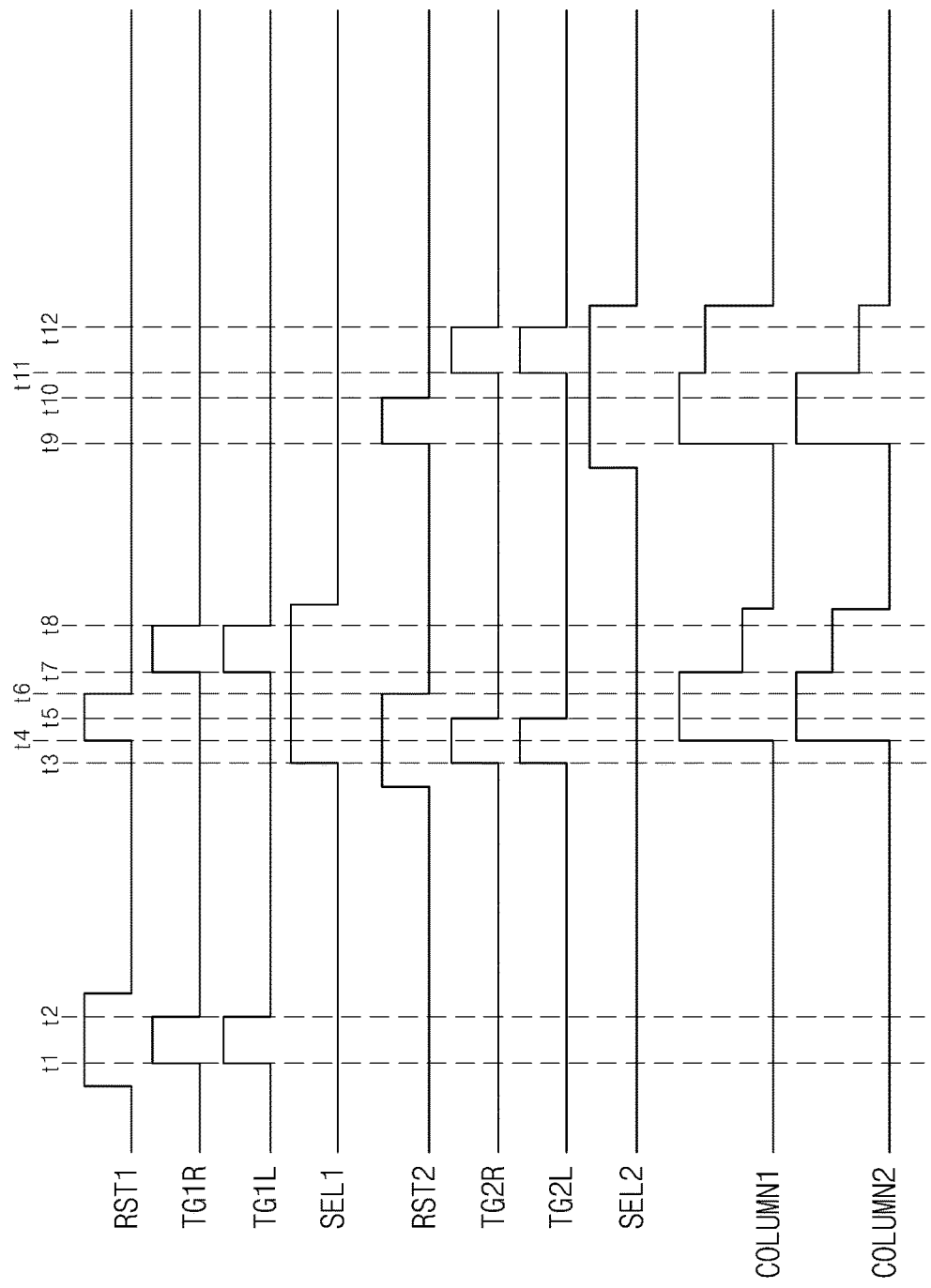

FIGS. 8A and 8B are timing diagrams illustrating the operations of the control line and the output line, according to an embodiment of the present disclosure.

FIG. 8A illustrates the operations of the control line and the output line in the circuit configuration of the pixel array illustrated in FIG. 7B. The timing diagram illustrated in FIG. 8A represents the case of individually reading output values from two photodiodes. The operation according to the timing diagram may be performed by a circuit which drives the image sensor. In FIG. 8A, the reference numerals of FIG. 7B will be used.

Referring to FIG. 8A, the photodiodes PD1R and PD2R may be initialized at t1. The photodiode PD1L is initialized at t3. Thereafter, signals may be output from the photodiodes PD1R and PD2R at t9, and a signal may be output from the photodiode PD1L at t14. To perform the CDS operation for signals output of the pixels in a next operation, a reset level may be output at t6 and t11 before the signals are output. If the output of the signal from the photodiode PD1L is terminated, signals may be output from the photodiodes PD3R and PD4R at t18, and a signal may be output from the photodiode PD3L at t22. Initialization is performed for the photodiodes in advance at t5 and t10, and a reset level may be output to perform the CDS processing at t16 and t20. In this case, the photodiodes PD1R and PD2R may be exposed for the duration of t2 to t10.

FIG. 8B illustrates the operations of the control line and the output line in the circuit configuration of the pixel array illustrated in FIG. 7B. The timing diagram illustrated in FIG. 8B represents the case of simultaneously reading output values from two photodiodes. The operation according to the timing diagram may be performed by a circuit which drives the image sensor. In FIG. 8B, the reference numerals of FIG. 7B will be used.

Referring to FIG. 8B, the photodiodes PD1R, PD1L, and PD2R are simultaneously initialized at t1, and signals may be simultaneously output from the photodiodes PD1R, PD1L, and PD2R at t7. Since charges are simultaneously output from the photodiodes PD1R and PD1L, charges are added at a relevant output time point. To perform the CDS operation for signals output of the pixels in a next operation, a reset level may be output at t4 before the signals are output. If the output of the signals from the photodiodes PD1R, PD1L, and PD2R is terminated, signals are output from the photodiodes PD3R, PD3L, and PD4R at t11. Similarly, in this case, the adding of charges of the photodiodes PD3R and PD3L may be performed due to the simultaneously output of the signals. Even in this case, the initialization of the photodiodes is performed in advance at t3 and the reset level is output at t9 to perform the CDS processing. The photodiodes PD1R, PD1L, and PD2R are exposed for the duration of t2 to t8, and the photodiodes PD3R, PD3L, and PD4R may be exposed for the duration of t5 to t12. Since charges are simultaneously output from the left and right photodiodes, the difference in exposure time between the photodiodes may not be occurred.

According to an embodiment of the present disclosure described above with reference to FIG. 8A, the second pixel 510Gr may include a single photoelectric conversion device, and the second pixel 510Gb may include two photoelectric conversion devices. Similarly, the second pixel 710Gr may include two photoelectric conversion devices and the second pixel 710Gb may include a single photoelectric conversion device. Accordingly, the difference may be made in signal characteristic between the second pixel 510Gr and the second pixel 510Gb, and between the second pixel 710Gr and the second pixel 710Gb.

Accordingly, if the characteristic difference is made in sensitivity or a saturation level, noise may be caused when image signal processing is performed in the following operations.

Figure 9:
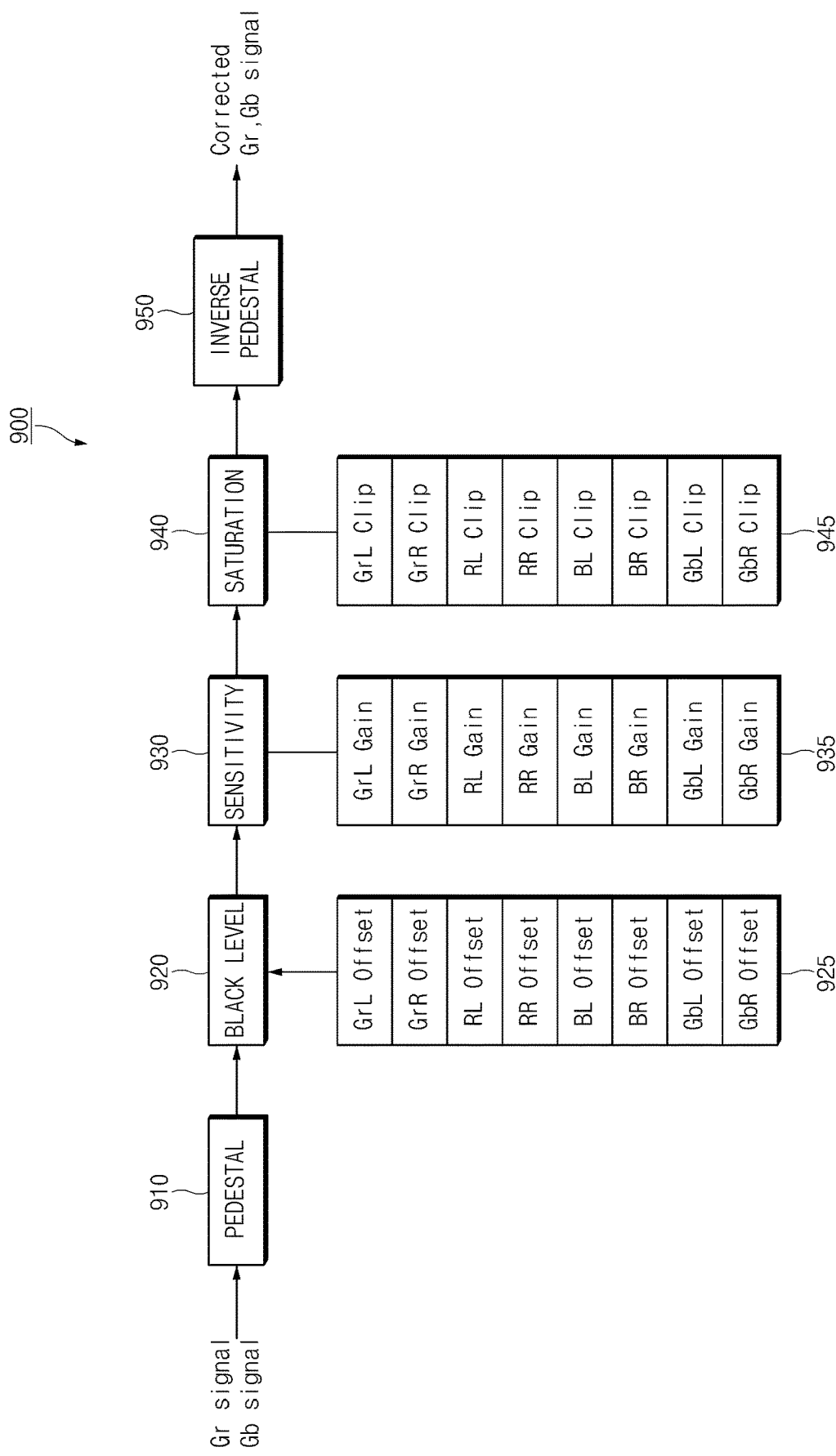
FIG. 9 illustrates a correction circuit, according to an embodiment of the present disclosure.

FIG. 9 illustrates a correction circuit, according to an embodiment of the present disclosure.

Referring to FIG. 9, a correction circuit 900 may correct a characteristic difference between image signals generated from some pixels (e.g., 510Gr and 710Gr) included in the second group of pixels and an image signal from other pixels (e.g., 510Gb and 710Gb) included in the second group of pixels. The correction circuit 900 may be included in the image processor 130 or may be implemented with an additional dedicated integrated circuit (IC) chip.

According to an embodiment of the present disclosure, the correction circuit 900 may receive the image signals from some pixels (e.g., 510Gr and 710Gr) included in the second group of pixels and the image signal generated from other pixels (e.g., 510Gb and 710Gb) included in the second group of pixels. Then, the correction circuit 900 may perform pedestal correction 910, black level correction 920, sensitivity correction 930, saturation level correction 940, and inverse pedestal correction 950 between the image signals from the some pixels in the second group of pixels and the image signal from the other pixels in the second group of pixels.

The correction circuit 900 may perform gain correction instead of the sensitivity correction 930, offset correction instead of the black level correction 920, and high clip correction instead of the saturation level correction 940. The correction circuit 900 may perform pedestal subtraction processing (e.g., pedestal correction 910) before the black level correction 920 and pedestal addition processing (e.g., inverse pedestal correction 950) after the saturation level correction 940 to exactly perform signal processing in the correction operations (e.g., black level correction 920, sensitivity correction 930, and saturation level correction 940).

The correction circuit 900 may change a correction value based on offset data 925, gain data 935, and clip data 945 of a photodiode depending on the type of the photodiode. The type of photodiode may include a type of a color filter or a type of arrangement of the color filter. Accordingly, the correction circuit 900 may correct the signal characteristic difference between the Gr pixel and the Gb pixel in the second group of pixels and may suppress noise.

Figure 10A:
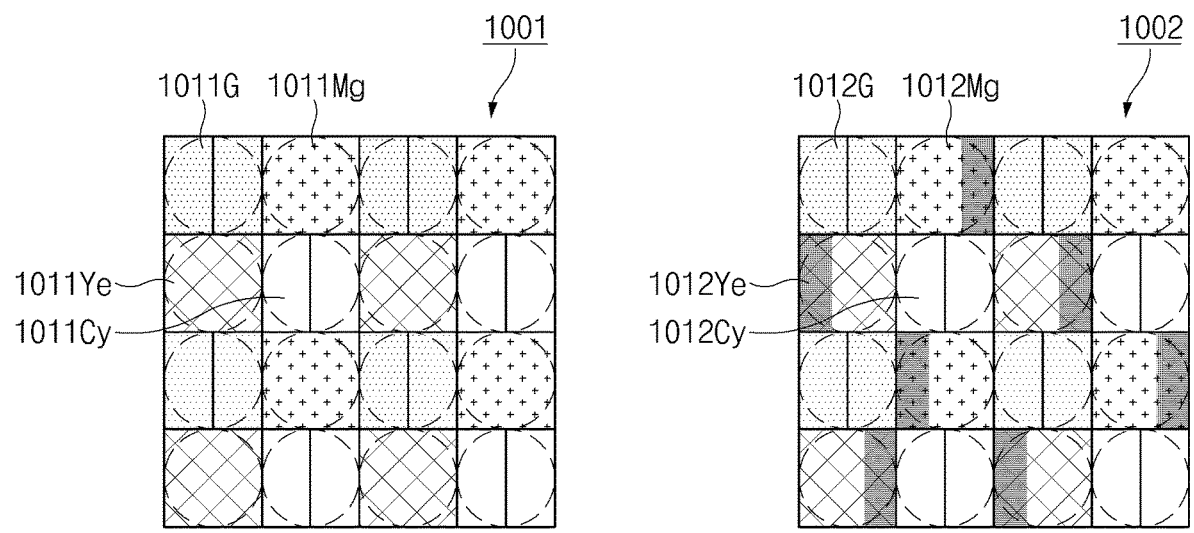
FIG. 10A illustrates a pixel array of an image sensor, according to an embodiment of the present disclosure.

FIG. 10A illustrates a pixel array of an image sensor, according to an embodiment of the present disclosure.

Referring to FIG. 10A, the image sensor 1001 may include a first pixel 1011Mg having a first color filter, a second pixel 1011Ye having a second color filter, a third pixel 1011G having a third color filter, and a fourth pixel 1011Cy having a fourth color filter.

The first color filter may pass at least a portion of light having the first wavelength range R and at least a portion of light having the third wavelength range B. The second color filter may pass at least a portion of light having the first wavelength range R and at least a portion of light having the second wavelength range G. The third color filter may pass light having the second wavelength range G and the fourth color filter may pass at least a portion of light having the second wavelength range G and at least a portion of light having the third wavelength range B. In this case, the first wavelength range may be designed to be longer than the second wavelength range, and the second wavelength range may be designed to be longer than the third wavelength range (that is, first wavelength range>second wavelength range>third wavelength range).

According to an embodiment of the present disclosure, a first group of pixels including the first pixel 1011Mg, a second group of pixels including the second pixel 1011Ye, a third group of pixels including the third pixel 1011G, and a fourth group of pixels including the fourth pixel 1011Cy may be arranged in a CYGM (cyan, yellow, green, magenta) pattern implemented with a complementary color filter. Accordingly, light passing through the first color filter may correspond to magenta light, light passing through the second color filter may correspond to yellow light, light passing through the third color filter may correspond to green light, and light passing through the fourth color filter may correspond to cyan light. In addition, the first group of pixels, the second group of pixels, the third group of pixels, and the fourth group of pixels may be provided in equal number.

According to an embodiment of the present disclosure, in the image sensor 1001, each of the first group of pixels and the second group of pixels may include a photoelectric conversion device. Each of the third group of pixels and the first group of pixels may include two single photoelectric conversion devices. For example, the first pixel 1011Mg included in the first group of pixels and the second pixel 1011Ye included in the second group of pixels may include a single photoelectric conversion device. For example, the third pixel 1011G included in the third group of pixels and the fourth pixel 1011Cy included in the fourth group of pixels may include two photoelectric conversion devices. In the case of the third pixel 1011G and the fourth pixel 1011Cy including two photoelectric conversion devices, an exit pupil may be split due to the optical position relation between the photoelectric conversion devices.

In the image sensor 1001, the first pixel 1011Mg and the second pixel 1011Ye may include a single photoelectric conversion device. Since the first pixel 1011Mg and the second pixel 1011Ye include a single photoelectric conversion device, the first pixel 1011Mg and the second pixel 1011Ye may receive light having the associated color with higher sensitivity.

Referring to FIG. 10A, the image sensor 1002 may include a first pixel 1012Mg having a first color filter passing magenta light, a second pixel 1012Ye having a second color filter passing yellow light, a third pixel 1012G having a third color filter passing green light, and a fourth pixel 1012Cy having a fourth color filter passing cyan light.

Since the first pixel 1012Ye, the second pixel 1012Ye, the third pixel 1012G, and the fourth pixel 1012Cy correspond to the first pixel 1011Mg, the second pixel 1011Ye, the third pixel 1011G, and the fourth pixel 1011Cy included in the image sensor 1001, respectively, the redundant details thereof will be omitted.

According to an embodiment of the present disclosure, some pixels in the first group of pixels including the first pixel 1012Mg may include masks to block a portion of light passing through the first color filter. Some pixels in the second group of pixels including the second pixel 1012Ye may include masks to block a portion of light passing through the second color filter. For example, the light receiving regions of the first pixel 1012Mg and/or the second pixel 1012Ye may be partially restricted by the masks. In addition, the light receiving region (e.g., a region occupied by the photoelectric conversion device) of the first pixel 1012Mg and/or the second pixel 1012Ye may be disposed eccentrically from the centers of micro-lenses included in the first pixel 1012Mg and/or the second pixel 1012Ye. Accordingly, the exit pupil may be partially restricted.

In the case of the image sensor 1002, all pixels in the first group of pixels including the first pixel 1012Mg and the second group of pixels including the second pixel 1012Ye include masks. According to various embodiments of the present disclosure, most pixels in the first group of pixels and the second group of pixels provided in the image sensor 1002 may not include the masks.

According to various embodiments of the present disclosure, the pattern of the pixel array of the image sensor 1001 or 1002 may not be limited to the CYGM pattern. For example, the pixel arrays of the image sensors 1001 and 1002 may have RGBE (red, green, blue, emerald) patterns. In this case, the first color filter may pass light having a wavelength range corresponding to red light. The second color filter may pass light having a wavelength range corresponding to green light. The third color filter may passes light having the wavelength range corresponding to emerald light. The fourth color filter may pass light having the wavelength range corresponding to blue light.

Figure 10B:
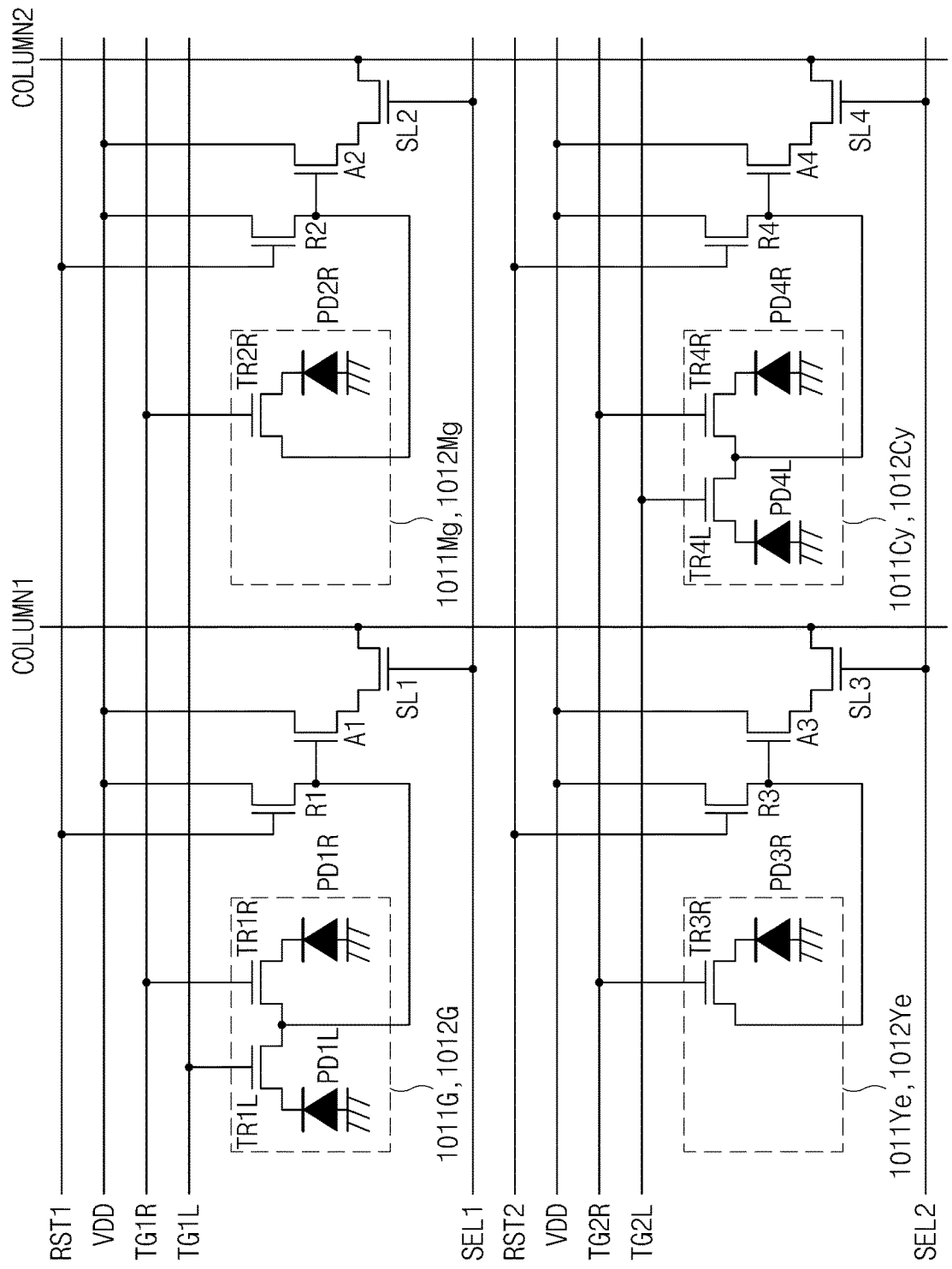
FIG. 10B illustrates a circuit configuration of a pixel array, according to an embodiment of the present disclosure.

FIG. 10B illustrates a circuit configuration of a pixel array, according to an embodiment of the present disclosure.

FIG. 10B illustrates the circuit configuration of pixel arrays included in the image sensors 1001 and 1002. According to an embodiment of the present disclosure, each of the first pixels 1011Mg and 1012Mg and the second pixels 1011Ye and 1012Ye may include a single photoelectric conversion device (e.g., a photodiode). Each of the third pixels 1011G and 1012G and the fourth pixels 1011Cy and 1012Cy may include two photoelectric conversion devices. The pixels may share control lines, such as lines RST1, RST2, TG1L, TG1R, TG2L, TG2R, SEL1, SEL2, and VDD together in a horizontal direction and may share output lines COLUMN1 and COLUMN2 together in a vertical direction.

In the third pixels 1011G and 1012G, two photodiodes PD1L and PD1R may be connected to source terminals of two transistors TR1L and TR1R, respectively. Gate terminals of the transistors TR1L and TR1R may be connected to lines TG1L and TG1R, respectively. A drain terminal of the transistor TR1L may be connected with a drain terminal of the transistor TR1R. A node that the drain terminal of the transistor TR1L is connected with the drain terminal of the transistor TR1R may be connected with a drain terminal of a transistor R1 and a gate terminal of a transistor A1. A gate terminal of the transistor R1 may be connected to a line RST1, and a source terminal of the transistor R1 may be connected to the line VDD. A source terminal of the transistor A1 may be connected to the line VDD, and a drain terminal of the transistor A1 may be connected to a source terminal of a transistor SL1. A gate terminal of the transistor SL1 may be connected to a line SEL1, and a drain terminal of the transistor SL1 may be connected to the line COLUMN1.

The fourth pixels 1011Cy and 1012Cy may have the configurations and the connection relation similar to those of the third pixels 1011G and 1012G.

In each of the first pixels 1011Mg and 1012Mg including a single photodiode PD2R, the photodiode PD2R may be connected to a source terminal of a transistor TR2R. A gate terminal of the transistor TR2R may be connected to the line TG1R, and a drain terminal of the transistor TR2R may be connected with a drain terminal of a transistor R2 and a gate terminal of the transistor A2. A gate terminal of the transistor R2 may be connected to the line RST1, and a source terminal of the transistor R2 may be connected to the line VDD. A source terminal of the transistor A2 may be connected to the line VDD, and the drain terminal of the transistor A2 may be connected to a source terminal of a transistor SL2. A gate terminal of the transistor SL2 may be connected to the line SEL1, and a drain terminal of the transistor SL2 may be connected to the line COLUMN2.

The second pixels 1011Ye and 1012Ye may have the configurations and the connection relation similar to those of the first pixels 1011Mg and 1012Mg.

Figure 11A:
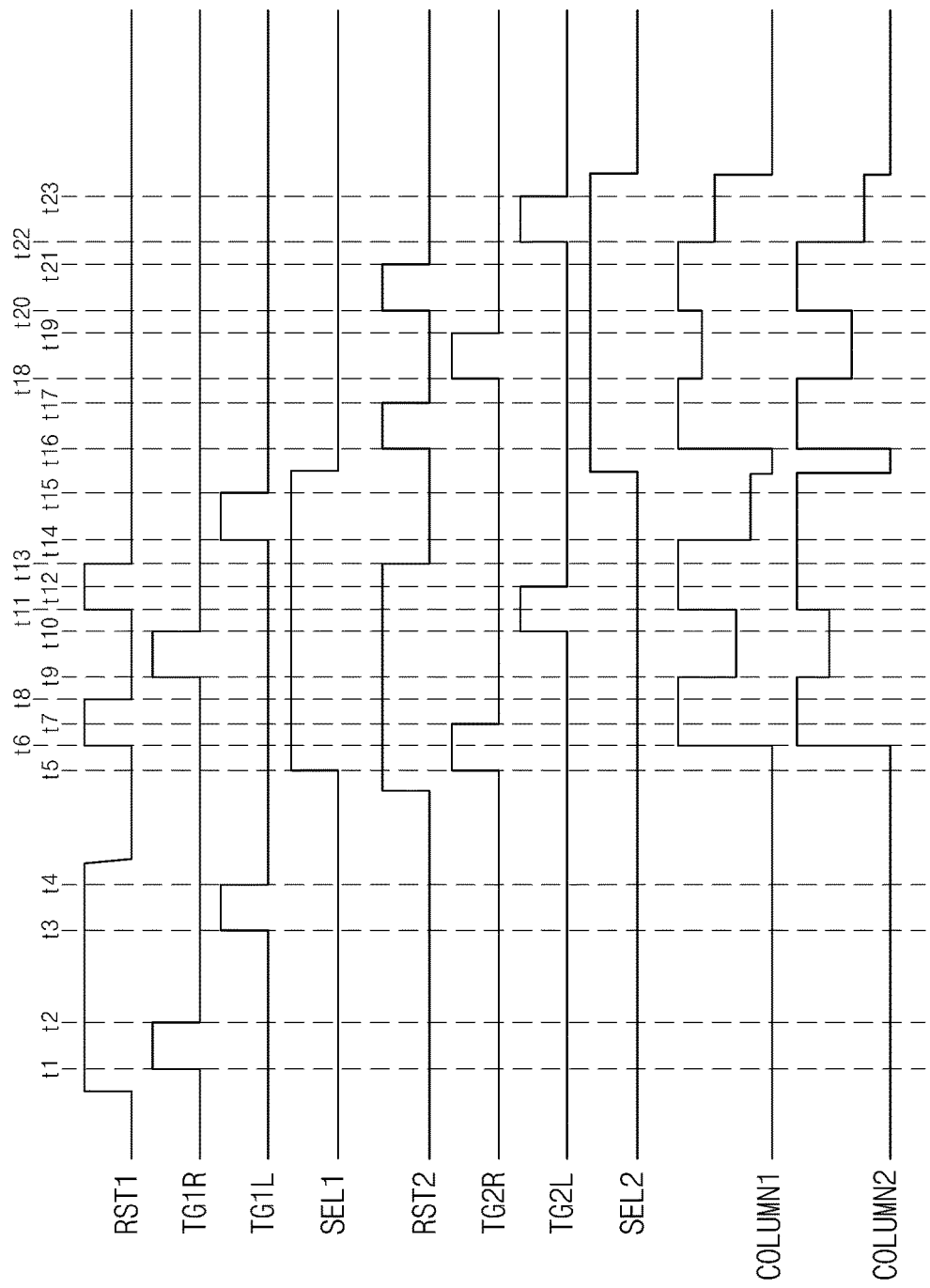
FIGS. 11A and 11B are timing diagrams illustrating the operations of a control line and an output line, according to an embodiment of the present disclosure.
Figure 11B:
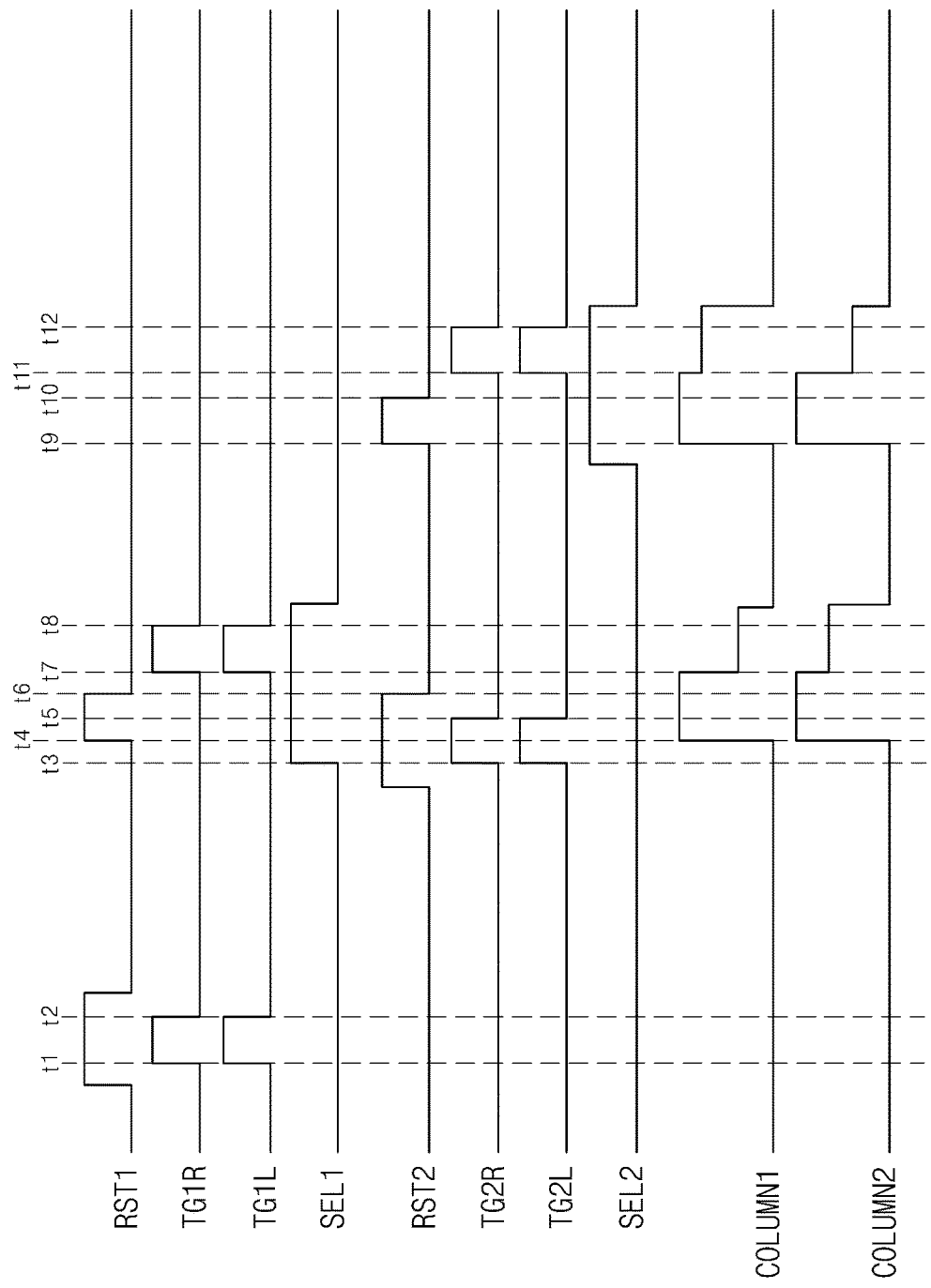

FIGS. 11A and 11B are timing diagrams illustrating the operations of the control line and the output line, according to an embodiment of the present disclosure.

FIG. 11A illustrates the operating example of the pixel array illustrated in FIG. 10B. FIG. 11A is a timing diagram illustrating individual reading from two photodiodes.

FIG. 11A illustrates the operations of the control line and the output line in the circuit configuration of the pixel array illustrated in FIG. 10B. The timing diagram illustrated in FIG. 11A represents the case of individually reading output values from two photodiodes. The operation according to the timing diagram may be performed by a circuit which drives the image sensor. In FIG. 11A, the reference numerals of FIG. 10B will be used.

Referring FIG. 11A, the photodiodes PD1R and PD2R may be initialized at t1 and the photodiode PD1L may be initialized at t3. Thereafter, signals may be output from the photodiodes PD1R and PD2R at t9, and a signal may be output from the photodiode PD1L at t14. To perform the CDS operation for signals output from pixels in a next operation, a reset level may be output at t6 and t11 before the signals are output. If the output of the signal from the photodiode PD1L is terminated, signals are output from the photodiodes PD3R and PD4R at t18, and signals may be output from the photodiode PD4L at t22. Even in this case, the initialization of the photodiodes is performed in advance at t5 and t10 and the reset level is output to perform the CDS processing at t16 and t20. In this case, the photodiodes PD1R and PD2R may be exposed for the duration of t2 to t10, and the photodiode PD1L may be exposed for the duration of t4 to t15.

FIG. 11B illustrates the operations of the control line and the output line in the circuit configuration of the pixel array illustrated in FIG. 10B. The timing diagram illustrated in FIG. 11B represents the case of simultaneously reading output values from two photodiodes. The operation according to the timing diagram may be performed by a circuit which drives the image sensor. In FIG. 11B, the reference numerals of FIG. 10B will be used.

Referring to FIG. 11B, the photodiodes PD1R, PD1L, and PD2R are simultaneously initialized at t1, and signals may be simultaneously output from the photodiodes PD1R, PD1L, and PD2R at t7. Since charges are simultaneously output from the photodiodes PD1R and PD1L, charges are added at a relevant output time point. To perform the CDS operation for signals output of pixels in a next operation, reset levels may be output at t4 before the signals are output. If the output of the signal from the photodiodes PD1R, PD1L, and PD2R is terminated, signals are output from the photodiodes PD3R, PD4R, and PD4L at t11. In this case, due to the simultaneously output of the signals, the adding of charges of the photodiodes PD4R and PD4L are performed. Initialization is performed even for the photodiodes PD4R, and PD4L at t3, and a reset level may be output to perform the CDS processing at t9. The photodiodes PD1R, PD1L, and PD2R may be exposed for the duration of t2 to t8, and the photodiodes PD3R, PD4R, and PD4L are exposed for the duration of t5 to t12. Since charges are simultaneously output from left and right photodiodes, the difference in exposure time between the photodiodes may not be occurred.

Figure 12A:
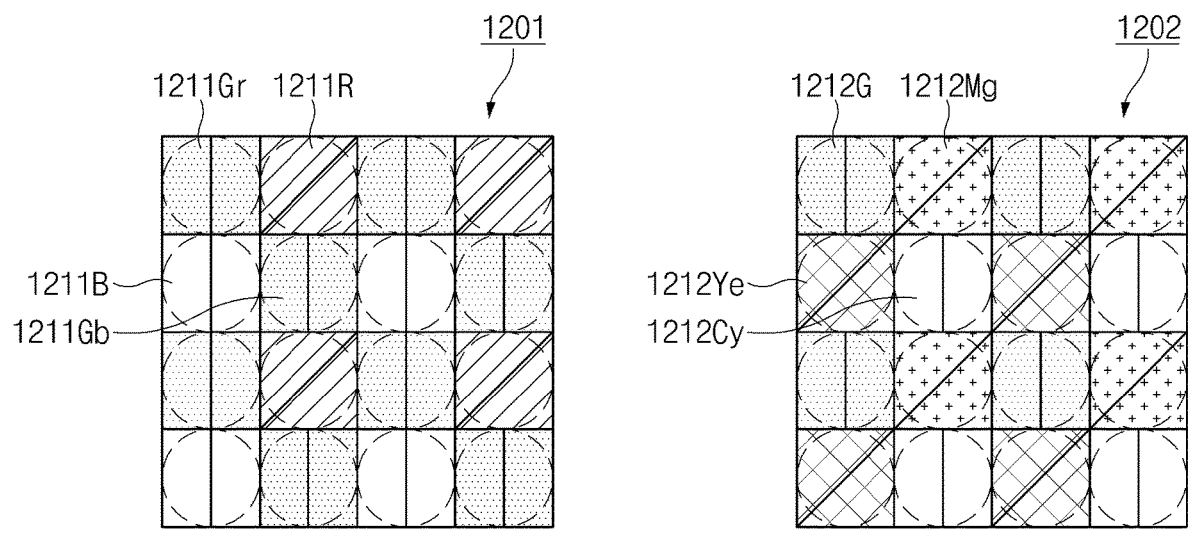
FIG. 12A illustrates a pixel array of an image sensor, according to an embodiment of the present disclosure.

FIG. 12A illustrates a pixel array of an image sensor, according to an embodiment of the present disclosure.

Referring to FIG. 12A, the image sensor 1201 may include a first pixel 1211R having a first color filter passing light having a first wavelength range, second pixels 1211Gr and 1211Gb having second color filters passing light having a second wavelength range, and a third pixel 1211B having a third color filter passing light having a third wavelength range. In this case, the first wavelength range may be designed to be longer than the second wavelength range, and the second wavelength range may be designed to be longer than the third wavelength range (that is, first wavelength range>second wavelength range>third wavelength range).

For example, the pixels in each group provided in the image sensor 1201 may be arranged in a Bayer pattern. Accordingly, the first wavelength range may correspond to red light, the second wavelength range may correspond to green light, and the third wavelength range may correspond to blue light.

According to an embodiment of the present disclosure, each of the pixels 1211R, 1211Gr, 1211Gb, and 1211B of the image sensor 1201 may include two photoelectric conversion devices. In all pixels 1211R, 1211Gr, 1211Gb, and 1211B, an exit pupil may be split due to the optical position relation between the photoelectric conversion devices.

Two photoelectric conversion devices included in each of the second pixels 1211Gr and 1211Gb may be disposed in an region obtained by splitting a relevant one of the second pixels 1211Gr and 122Gb in a direction parallel to one side of the relevant pixel. Two photoelectric conversion devices included in the third pixel 1211B may be disposed in a region obtained by splitting the third pixel 1211B in a direction parallel to one side thereof. In other words, two photoelectric conversion devices included in each of the second pixels 1211Gr and 1211Gb and the third pixel 1211B may have a rectangular shape.

In addition, two photoelectric conversion devices included in the first pixel 1211R may be disposed in a region obtained by splitting the first pixel 1211R in a diagonal direction. Accordingly, in the first pixel 1211R, the exit pupil may be split in the diagonal direction. The diagonal-pitch of the pixel may be designed to be longer than the maximum length of the first wavelength. Accordingly, even if each of the pitches of all pixels including the first pixel 1211R is 0.707 μm, since the diagonal-pitch of each pixel is about 1 μm, the sensitivity of red light having the wavelength of about 700 nm may be ensured.

Referring to FIG. 12A, the image sensor 1202 may include a first pixel 1212Mg having a first color filter passing at least a portion of light of the first wavelength range R and at least a portion of light of the third wavelength range B, a second pixel 1212Ye having a second color filter passing at least a portion of light having the first wavelength range R and at least a portion of light having the second wavelength range G, a third pixel 1212G having a third color filter passing light having the second wavelength range G, and a fourth pixel 1212Cy having a fourth color filter passing at least a portion of light having the second wavelength range G and at least a portion of light having the third wavelength range B.

The pixels in each group provided in the image sensor 1202 may be arranged in a CYGM pattern implemented with a complementary color filter. In other words, in the image sensor 1202, the first color filter of the first pixel 1212Mg may pass magenta light, the second color filter of the second pixel 1212Ye may pass yellow light, the third color filter of the third pixel 1212G may pass green light, and the fourth color filter of the fourth pixel 1212Cy may pass cyan light.

According to an embodiment of the present disclosure, each of the pixels 1212Mg, 1212Ye, 1212G, and 1212Cy provided in the image sensor 1202 may include two photoelectric conversion devices. In all pixels 1212Mg, 1212Ye, 1212G, and 1212Cy, an exit pupil may be split due to the optical position relation between the photoelectric conversion devices.

Two photoelectric conversion devices included in the third pixel 1212G may be disposed in a region obtained by splitting the third pixel 1212G in a direction parallel to one side of the third pixel 1212G. Two photoelectric conversion devices included in the fourth pixel 1212Cy may be disposed in a region obtained by splitting the fourth pixel 1212Cy in a direction parallel to one side of the fourth pixel 1212Cy. In other words, two photoelectric conversion devices included in each of the third pixel 1212G and the fourth pixel 1212Cy may have a rectangular shape.

In addition, two photoelectric conversion devices included in the first pixel 1212Mg may be disposed in a region obtained by splitting the first pixel 1212Mg in a diagonal direction. Two photoelectric conversion devices included in the second pixel 1212Ye may be disposed in a region obtained by splitting the second pixel 1212Ye in a diagonal direction. Accordingly, in the first pixel 1212Mg and the second pixel 1212Ye, the exit pupil may be split in the diagonal direction.

Figure 12B:
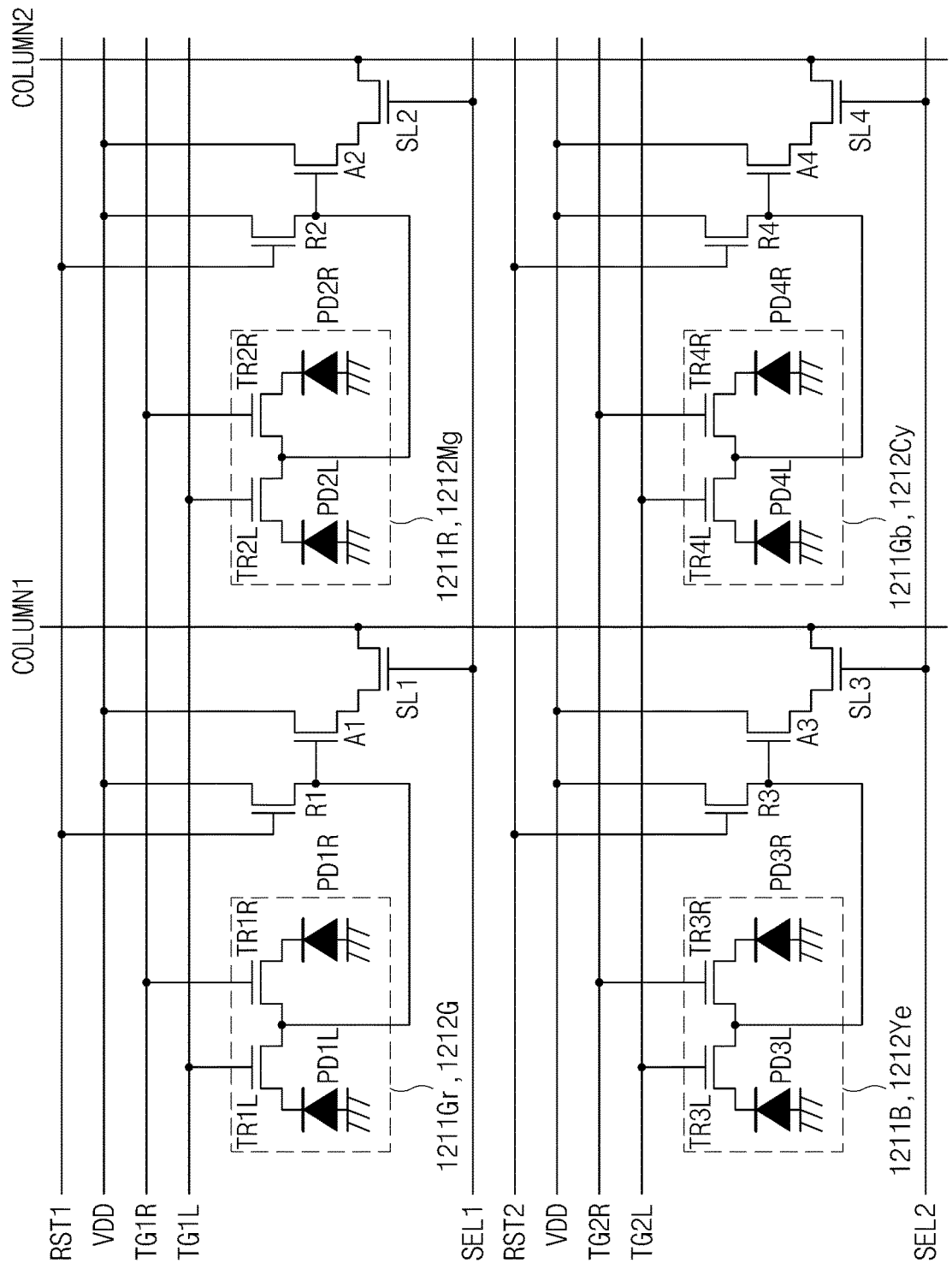
FIG. 12B illustrates a circuit configuration of a pixel array, according to an embodiment of the present disclosure.

FIG. 12B illustrates a circuit configuration of a pixel array, according to an embodiment of the present disclosure.

FIG. 12B illustrates, the circuit configuration of pixel arrays included in the image sensors 1201 and 1202. Each of the pixels included in the image sensors 1201 and 1202 may include two photoelectric conversion devices (e.g., photodiodes). The pixels may share control lines, such as lines RST1, RST2, TG1L, TG1R, TG2L, TG2R, SEL1, SEL2, and VDD together in a horizontal direction and may share output lines COLUMN1 and COLUMN 2 together in a vertical direction.

For example, in the first pixels 1211R and 1212Mg, two photodiodes PD2L and PD2R may be connected to source terminals of two transistors TR2L and TR2R, respectively. Gate terminals of the transistors TR2L and TR2R may be connected to lines TG1L and TG1R, respectively. A drain terminal of the transistor TR2L may be connected with a drain terminal of the transistor TR2R. A node that the drain terminal of the transistor TR2L is connected with the drain terminal of the transistor TR2R may be connected with a drain terminal of a transistor R2 and a gate terminal of a transistor A2. A gate terminal of the transistor R2 may be connected to the line RST1, and a source terminal of the transistor R2 may be connected to the line VDD. A source terminal of the transistor A2 may be connected to the line VDD, and a drain terminal of the transistor A2 may be connected to a source terminal of a transistor SL2. A gate terminal of the transistor SL2 may be connected to the line SEL1, and a drain terminal of the transistor SL2 may be connected to the line COLUMN2.

Remaining pixels 1211Gr, 1212G, 1211B, 1212Ye, 1211Gb, and 1212Cy including two photodiodes may have the configurations and the connection relation similar to those of the first pixels 1211R and 1212Mg as illustrated in FIG. 12B.

Figure 13A:
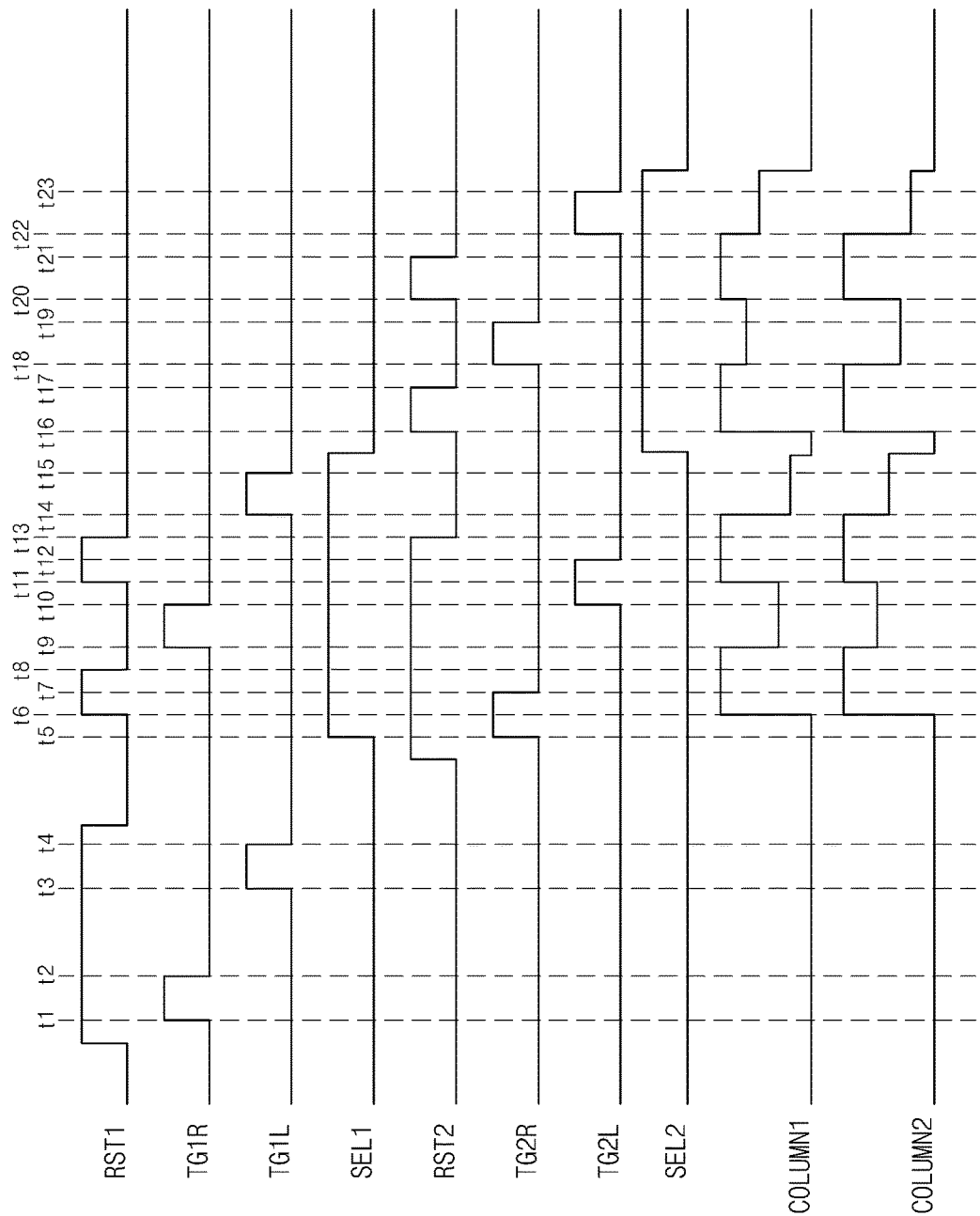
FIGS. 13A and 13B are timing diagrams illustrating the operations of a control line and an output line, according to an embodiment of the present disclosure.
Figure 13B:
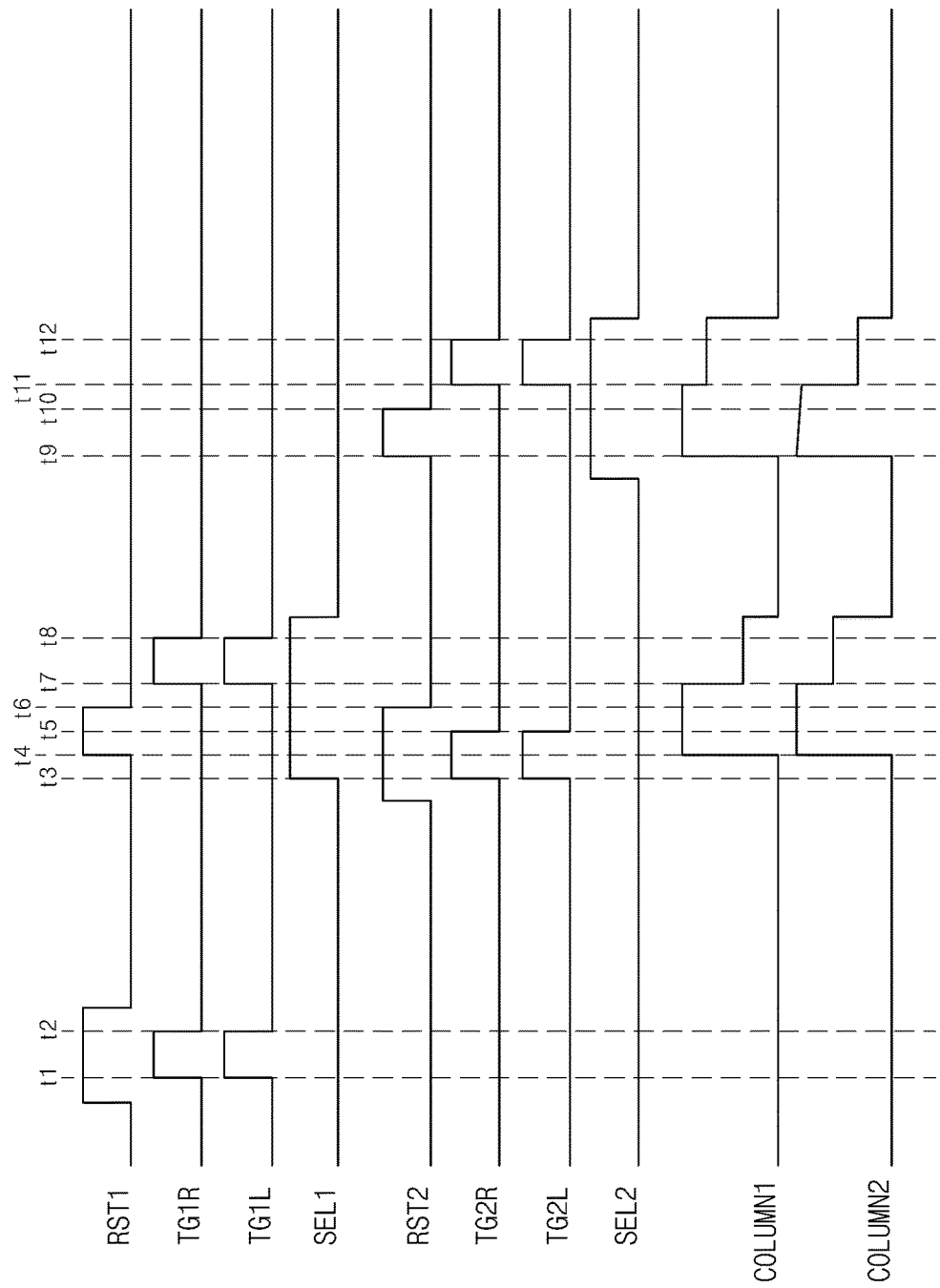

FIGS. 13A and 13B are timing diagrams illustrating the operations of the control line and the output line, according to an embodiment of the present disclosure.

FIG. 13A illustrates the operations of the control line and the output line in the circuit configuration of the pixel array illustrated in FIG. 12B. The timing diagram illustrated in FIG. 13A represents the case of individually reading output values from two photodiodes. The operation according to the timing diagram may be performed by a circuit which drives the image sensor. In FIG. 13A, the reference numerals of FIG. 12B will be used Referring to FIG. 13A, the photodiodes PD1R and PD2R may be initialized at t1 and the photodiodes PD1L and PD2L may be initialized at t3. Thereafter, signals may be output from the photodiodes PD1R and PD2R at t9, and signals may be output from the photodiodes PD1L and PD2L at t14. To perform the CDS operation for signals output of pixels in a next operation, a reset level may be output in advance at t6 and t11 before the signals are output. If the output of the signals from the photodiodes PD1L and PD2L is terminated, signals are output from the photodiodes PD3R and PD4R at t18, and signals may be output from the photodiodes PD3L and PD4L at t22. In this case, initialization is performed for the photodiodes in advance at t5 and t10 and a reset level may be output to perform the CDS processing at t16 and t20. In this case, the photodiodes PD1R and PD2R are exposed for the duration of t2 to t10, and the photodiodes PD1L and PD2L are exposed for the duration of t4 to t15. The exposing times of the photodiodes PD1R and PD2R may be equal to the exposing times of the photodiodes PD1L and PD2L.

FIG. 13B illustrates the operations of the control line and the output line in the circuit configuration of the pixel array illustrated in FIG. 12B. The timing diagram illustrated in FIG. 13B represents the case of simultaneously reading output values from two photodiodes. The operation according to the timing diagram may be, performed by a circuit which drives the image sensor. In FIG. 13B, the reference numerals of FIG. 12B will be used Referring to FIG. 13B, the photodiodes PD1R, PD1L, PD2R, and PD2L are simultaneously initialized at t1, and signals may be simultaneously output from the photodiodes PD1R, PD1L, PD2L, and PD2L at t7. At this time, the adding of charges of the photodiodes PD1R and PD1L and the adding of charges of the photodiodes PD2R and PD2L are performed. To perform the CDS operation for signals output from the pixels in a next operation, a reset level may be output at t4 before the signals are output. If the output of the signal from the photodiodes PD1R, PD1L, PD2R, and PD2L is terminated, signals are output from the photodiodes PD3R, PD3L, PD4R, and PD4L at t11. At this time, the adding of charges of the photodiodes PD3R and PD3L and the adding of charges of the photodiodes PD4R and PD4L are performed. Even in this case, the initialization of the photodiodes is performed in advance at t3 and a reset level is output to perform the CDS processing at t9. In this case, the photodiodes PD1R, PD1L, PD2R, and PD2L are exposed for the duration of t2 to t8, and the photodiodes PD3R, PD3L, PD4R, and PD4L are exposed for the duration of t5 to t12. Since charges are simultaneously output from the left and right photodiodes, the difference in exposure time between the photodiodes may not be occurred.

According to various embodiments of the present disclosure, the sensitivity to red light may be prevented from being degraded even in the image sensor having significantly small pixels. In addition, various modifications and various combinations of the embodiments are possible without departing from the subject matter of the present disclosure.

As described above, an image sensor according to an embodiment of the present disclosure may include a first group of pixels including a first color filter passing light having a first wavelength range, a second group of pixels including a second color filter passing light having a second wavelength range, and a third group of pixels including a third color filter passing light having a third wavelength range. The first wavelength range may be longer than the second wavelength range, and the second wavelength range may be longer than the third wavelength range. A second pixel in the second group of pixels or a third pixel in the third group of pixels may include a plurality of photoelectric conversion devices, and a first pixel of the first group of pixels may include a single photoelectric conversion device.

According to an embodiment of the present disclosure, the plurality of photoelectric conversion devices in the second pixel or the third pixel may have equal light receiving areas.

According to an embodiment of the present disclosure, each of the second pixel and the third pixel may include two photoelectric conversion devices.

According to an embodiment of the present disclosure, some pixels included in the second group of pixels may include two photoelectric conversion devices, and each of other pixels included in the second group of pixels may include one photoelectric conversion device.

According to an embodiment of the present disclosure, some pixels in the first group of pixels may further include a mask to block a portion of light passing through the first color filter.

Accordingly, the first wavelength range may correspond to red light, the second wavelength range may correspond to green light, and the third wavelength range may correspond to blue light.

According to an embodiment of the present disclosure, the first color filter may be designed to further pass light having at least a portion of the third wavelength range, the second color filter may be designed to further pass light having at least a portion of the first wavelength range, and the third color filter may be designed to further pass light having at least a portion of the second wavelength range. In this case, light passing through the first color filter may correspond to magenta light, light passing through the second color filter may correspond to yellow light, and light passing through the third color filter may correspond to cyan light.

According to an embodiment of the present disclosure, the number of the second group of pixels may be twice larger than the number of the first group of pixels or the number of the third group of pixels.

According to an embodiment of the present disclosure, the image sensor may further include a fourth group of pixels including a fourth color filter passing light having at least a portion of the second wavelength range and light having at least a portion of the third wavelength range. The first color filter may be designed to further pass light having at least a portion of the third wavelength range, and the second color filter may be designed to further pass light having at least a portion of the first wavelength range. In this case, light passing through the first color filter may correspond to magenta light, light passing through the second color filter may correspond to yellow light, light passing through the third color filter may correspond to green light, and light passing through the fourth color filter corresponds to cyan light.

According to an embodiment of the present disclosure, the second pixel may be designed to include a single photoelectric conversion device, and each of the third pixel and a fourth pixel in the fourth group of pixels may be designed include a plurality of photoelectric conversion devices.

According to an embodiment of the present disclosure, the number of the first group of pixels, the number of the second group of pixels, the number of the third group of pixels, and the number of the fourth group of pixels may be in equal.

According to another embodiment of the present disclosure, an image sensor may include a first group of pixels including a first color filter passing light having a first wavelength range, a second group of pixels including a second color filter passing light having a second wavelength range, and a third group of pixels including a third color filter passing light having a third wavelength range. The first wavelength range may be longer than the second wavelength range, and the second wavelength range may be longer than the third wavelength range. A first pixel in the first group of pixels may include two photoelectric conversion devices, and the two photoelectric conversion devices included in the first pixel may be disposed in regions obtained by splitting the first pixel in a diagonal direction.

According to an embodiment of the present disclosure, each of a second pixel in the second group of pixels and a third pixel in the third group of pixels may include two photoelectric conversion devices. The two photoelectric conversion devices included in the second pixel may be disposed in regions obtained by splitting the second pixel in a direction parallel to one side of the second pixel, and the two photoelectric conversion devices included in the third pixel may be disposed in regions obtained by splitting the third pixel in a direction parallel to one side of the third pixel.

According to an embodiment of the present disclosure, the image sensor may further include a fourth group of pixels including a fourth color filter passing light having a fourth wavelength range. The fourth wavelength range may be shorter than the third wavelength range.

According to an embodiment of the present disclosure, each of the second pixel in the second group of pixels, the third pixel in the third group of pixels, and the fourth pixel in the fourth group of pixels includes two photoelectric conversion devices. The two photoelectric conversion devices included in the second pixel may be disposed in regions obtained by splitting the second pixel in a diagonal direction. The two photoelectric conversion devices included in the third pixel may be disposed in regions obtained by splitting the third pixel in a direction parallel to one side of the third pixel. The two photoelectric conversion devices included in the fourth pixel may be disposed in regions obtained by splitting the fourth pixel in a direction parallel to one side of the fourth pixel.

According to an embodiment of the present disclosure, an electronic device may include a lens which concentrates light incident thereto from outside, an image sensor which generates an image signal based on the light, and an image processor which processes the image signal. The image sensor may include a first group of pixels including a first color filter passing light having a first wavelength range, a second group of pixels including a second color filter passing light having a second wavelength range shorter than the first wavelength filter, and a third group of pixels including a third color filter passing light having a third wavelength range shorter than the second wavelength range. Some pixels in the second group of pixels may include two photoelectric conversion devices, and each of other pixels in the second group of pixels may include one photoelectric conversion device. The image processor may correct a characteristic difference between image signals generated from the some pixels in the second group of pixels and image signals generated from the other pixels in the second group of pixels.

According to an embodiment of the present disclosure, the image processor may be configured to correct a difference between the image signals generated from the some pixels in the second group of pixels and the image signals generated from the other pixels in the second group of pixels, in at least one of a black level, a saturation level, and sensitivity.

According to an embodiment of the present disclosure, the electronic device may further include a quarter wave plate which converts the concentrated light into a circular polarized light.

Figure 14:
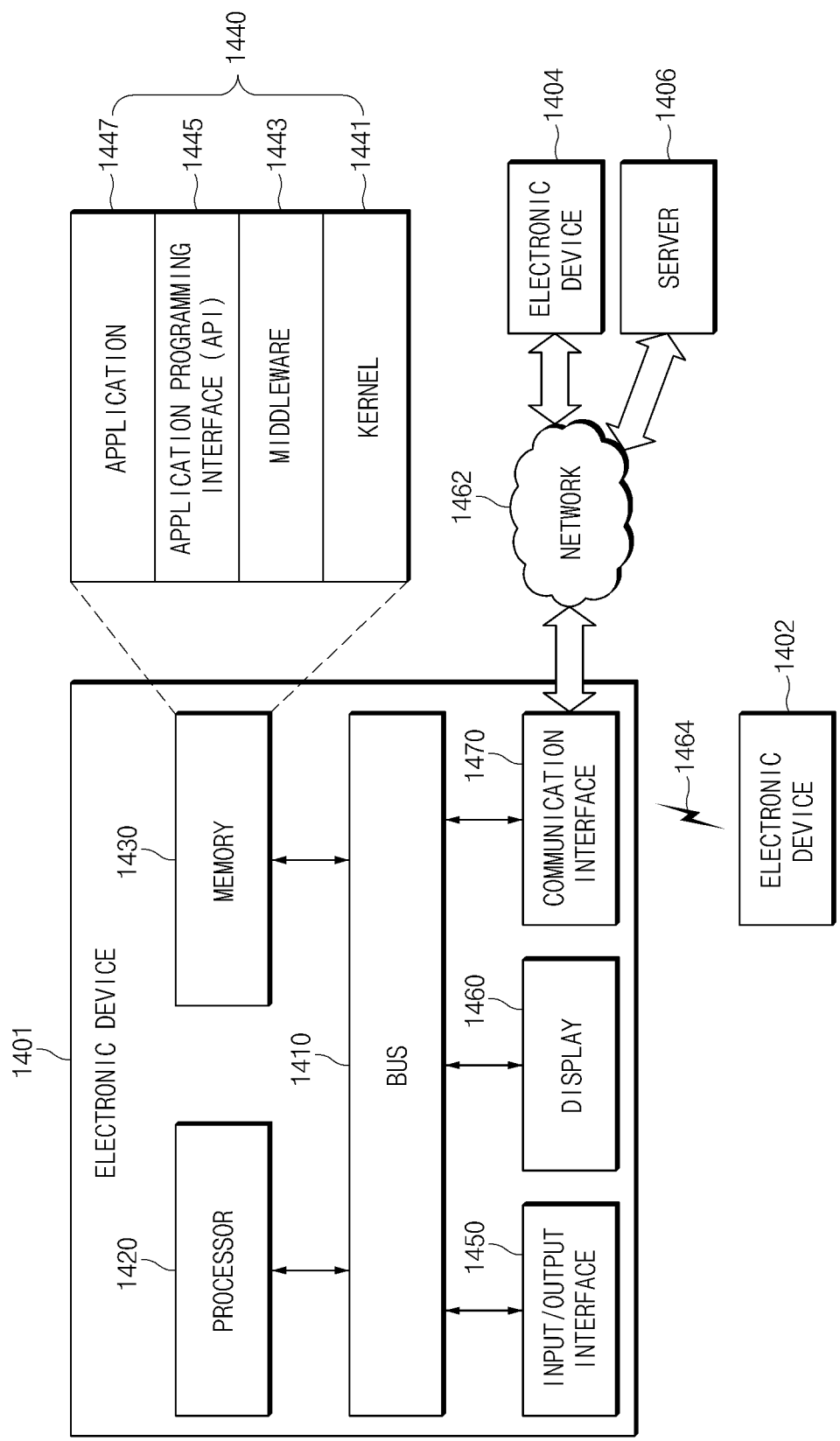
FIG. 14 illustrates an electronic device, according to various embodiments of the present disclosure.

FIG. 14 illustrates an electronic device according to various embodiments of the present disclosure.

Referring to FIG. 14, an electronic device 1401, 1402, and 1404, or a server 1406 may be connected with each other over a network 1462 or local wireless communication 1464. The electronic device 1401 may include a bus 1410, a processor 1420, a memory 1430, an input/output interface 1450, a display 1460, and a communication interface 1470. The electronic device 1401 may not include at least one of the above-described elements or may further include other element(s).

According to an embodiment of the present disclosure, the camera module 100 may correspond to the electronic device 1401. The camera module 100 may be connected to the electronic device 1401 through the input/output interface 1450 or the communication interface 1470. In addition, the processor 150, the memory 160, and the display 170 may correspond to the processor 1420, the memory 1430, and the display 1460, respectively.

The bus 1410 may interconnect the above-described elements 1420 to 1470 and may include a circuit for conveying communications (e.g., a control message and/or data) among the above-described elements.

The processor 1420 may include one or more of a CPU, an AP, or a communication processor (CP). For example, the processor 1420 may perform an arithmetic operation or data processing associated with control and/or communication of at least other elements of the electronic device 1401.

The memory 1430 may include a volatile and/or nonvolatile memory. The memory 1430 may store instructions or data associated with at least one other element(s) of the electronic device 1401. The memory 1430 may store software and/or a program 1440.

The program 1440 may include, for example, a kernel 1441, a middleware 1443, an application programming interface (API) 1445, and/or applications 1447. At least a part of the kernel 1441, the middleware 1443, or the API 1445 may be referred to as an operating system (OS).

For example, the kernel 1441 may control or manage system resources (e.g., the bus 1410, the processor 1420, the memory 1430, and the like) that are used to execute operations or functions of other programs (e.g., the middleware 1443, the API 1445, and the applications 1447). Furthermore, the kernel 1441 may provide an interface that allows the middleware 1443, the API 1445, or the applications 1447 to access discrete elements of the electronic device 1401 so as to control or manage system resources.

The middleware 1443 may perform, for example, a mediation role such that the API 1445 or the applications 1447 communicates with the kernel 1441 to exchange data.

Furthermore, the middleware 1443 may process one or more task requests received from the applications 1447 according to a priority. For example, the middleware 1443 may assign the priority, which makes it possible to use a system resource (e.g., the bus 1410, the processor 1420, the memory 1430, etc.) of the electronic device 1401, to at least one of the applications 1447. For example, the middleware 1443 may process one or more task requests according to the priority assigned to the at least one, which makes it to possible to perform scheduling or load balancing on the one or more task requests.

The API 1445 may be, for example, an interface through which the applications 1447 controls a function provided by the kernel 1441 or the middleware 1443, and may include, for example, at least one interface or function (e.g., an instruction) for a file control, a window control, image processing, a character control, etc.

The input/output interface 1450 may play a role, for example, an interface which transmits an instruction or data input from a user or another external device, to other element(s) of the electronic device 1401. Furthermore, the input/output interface 1450 may output an instruction or data, received from other element(s) of the electronic device 1401, to a user or another external device.

The display 1460 may include, for example, an LCD, an LED display, an OLED display, a microelectromechanical systems (MEMS) display, or an electronic paper display. The display 1460 may display, for example, various contents (e.g., a text, an image, a video, an icon, a symbol, etc.) to a user. The display 1460 may include a touch screen and may receive, for example, a touch, gesture, proximity, or hovering input using an electronic pen or a part of a user's body.

The communication interface 1470 may establish communication between the electronic device 1401 and an external device (e.g., the first external electronic device 1402, the second external electronic device 1404, or the server 1406). The communication interface 1470 may be connected to the network 1462 over wireless communication or wired communication to communicate with the external device.

The wireless communication may include cellular communication which uses at least one of, for example, long-term evolution (LTE), LTE advanced (LTE-A), code division multiple access (CDMA), wideband CDMA (WCDMA), universal mobile telecommunications system (UMTS), wireless broadband (WiBro), global system for mobile communications (GSM), etc., as a cellular communication protocol. According to an embodiment of the present disclosure, the wireless communication may include at least one of wireless fidelity (Wi-Fi), Bluetooth™, Bluetooth low energy (BLE), Zigbee, near field communication (NFC), magnetic stripe transmission (MST) or magnetic secure transmission (MST), a radio frequency (RF), a body area network (BAN), a global navigation satellite system (GNSS), etc.

The MST may generate a pulse in response to transmission data using an electromagnetic signal, and the pulse may generate a magnetic field signal. The electronic device 1401 may transfer the magnetic field signal to a POS device, and the POS device may detect the magnetic field signal using a MSR (magnetic stripe reader or magnetic secure transmission reader). The POS may recover the data by converting the detected magnetic field signal to an electrical signal.

The GNSS may include at least one of, for example, a global positioning system (GPS), a global navigation satellite system (Glonass), a Beidou navigation satellite system (Beidou), or the European global satellite-based navigation system (Galileo) based on an available region, a bandwidth, etc. Hereinafter, in the present disclosure, the terms "GPS" and "GNSS" may be interchangeably used.

The wired communication may include at least one of, for example, a universal serial bus (USB), a high definition multimedia interface (HDMI), a recommended standard-232 (RS-232), a plain old telephone service (POTS), etc. The network 1462 may include at least one of telecommunications networks, for example, a computer network (e.g., LAN or WAN), an Internet, or a telephone network.

Each of the first and second electronic devices 1402 and 1404 may be a device of which the type is different from or the same as that of the electronic device 1401. According to an embodiment of the present disclosure, the server 1406 may include a group of one or more servers. All or a portion of operations that the electronic device 1401 will perform may be executed by another or a plurality of electronic devices (e.g., the electronic device 1402 or 1404, or the server 1406). In the case where the electronic device 1401 executes any function or service automatically, or in response to a request, the electronic device 1401 may not perform the function or the service internally, but it may request at least a portion of a function associated with the electronic device 1401 from another electronic device. The other electronic device may execute the requested function or additional function, and may transmit the execution result to the electronic device 1401. The electronic device 1401 may provide the requested function or service using the received result or may additionally process the received result to provide the requested function or service. To this end, cloud computing, distributed computing, or client-server computing may be used.

Figure 15:
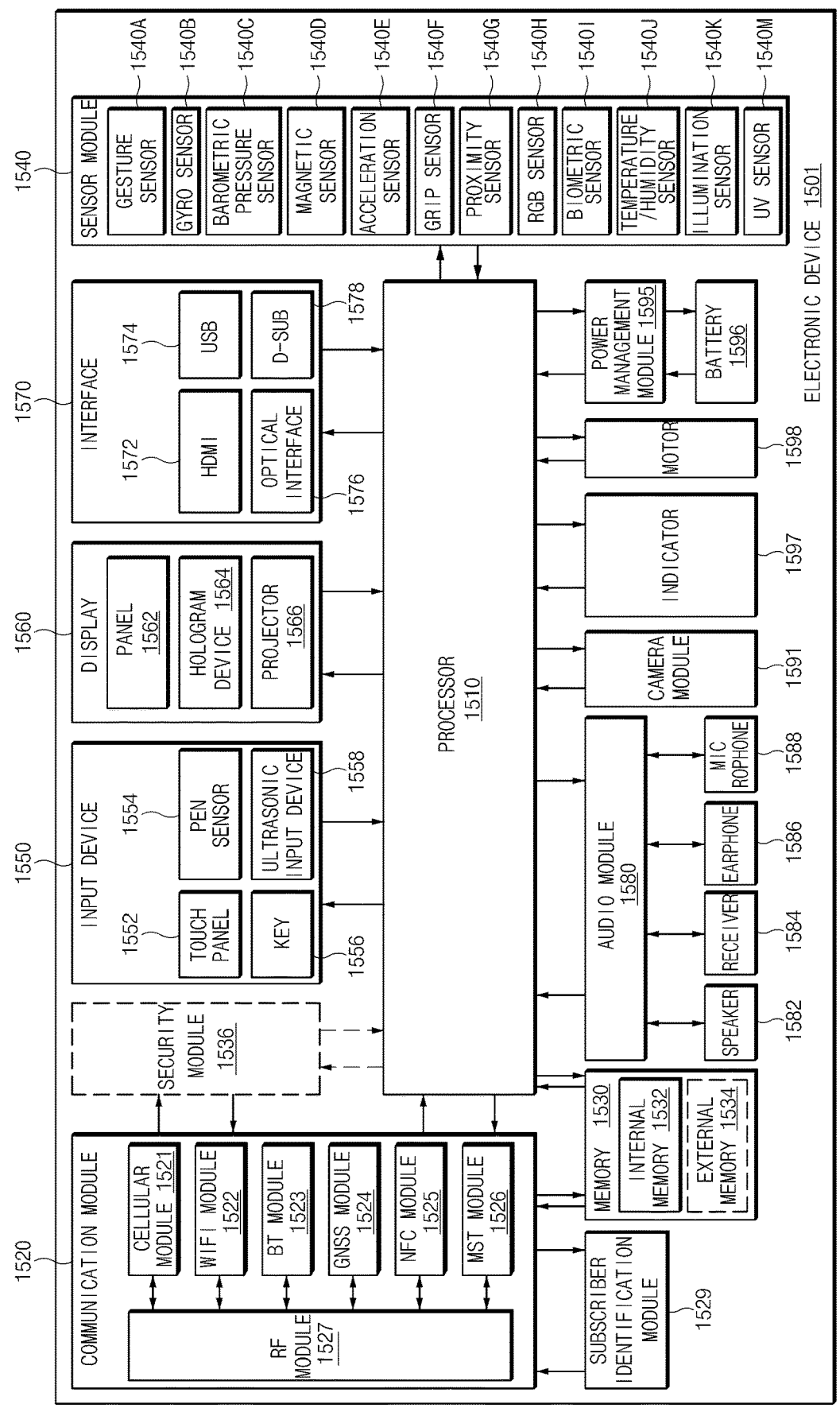
FIG. 15 illustrates a block diagram of an electronic device, according to various embodiments of the present disclosure.

FIG. 15 illustrates a block diagram of an electronic device, according to various embodiments of the present disclosure.

Referring to FIG. 15, an electronic device 1501 may include all or a part of the electronic device 1401. The electronic device 1501 may include one or more processors 1510 (e.g., an AP), a communication module 1520, a subscriber identification module (SIM) 1529, a memory 1530, security module 1236, a sensor module 1540, an input device 1550, a display 1560, an interface 1570, an audio module 1580, a camera module 1591, a power management module 1595, a battery 1596, an indicator 1597, and a motor 1598.

According to an embodiment of the present disclosure, the camera module 100 may correspond to the camera module 1591. In addition, the processor 150, the memory 160, and the display 170 may correspond to the processor 1510, the memory 1530, and the display 1560.

The processor 1510 may drive an OS or an application to control a plurality of hardware or software elements connected to the processor 1510, and may process and compute a variety of data. The processor 1510 may be implemented with a System on Chip (SoC). According to an embodiment of the present disclosure, the processor 1510 may further include a graphic processing unit (GPU) and/or an ISP. The processor 1510 may include at least a part (e.g., a cellular module 1521) of elements of electronic device 1501. The processor 1510 may load an instruction or data, which is received from at least one of other elements (e.g., a nonvolatile memory), into a volatile memory, and process the loaded instruction or data. The processor 1510 may store a variety of data in the nonvolatile memory.

The communication module 1520 may be configured the same as or similar to the communication interface 1470. The communication module 1520 may include the cellular module 1521, a Wi-Fi module 1522, a Bluetooth (BT) module 1523, a GNSS module 1524 (e.g., a GPS module, a Glonass module, a Beidou module, or a Galileo module), an NFC module 1525, an MST module 1526, and a radio frequency (RF) module 1527.

The cellular module 1521 may provide voice communication, video communication, a character service, an Internet service, etc. over a communication network. According to an embodiment of the present disclosure, the cellular module 1521 may perform discrimination and authentication of the electronic device 1501 within a communication network by using the SIM 1529 (e.g., a SIM card). The cellular module 1521 may perform at least a portion of the functions that the processor 1510 provides. The cellular module 1521 may include a CP.

Each of the Wi-Fi module 1522, the BT module 1523, the GNSS module 1524, the NFC module 1525, or the MST module 1526 may include a processor for processing data exchanged through a corresponding module. According to an embodiment of the present disclosure, at least a part (e.g., two or more) of the cellular module 1521, the Wi-Fi module 1522, the BT module 1523, the GNSS module 1524, the NFC module 1525, or the MST module 1526 may be included within one IC or an IC package.

The RF module 1527 may transmit and receive a communication signal (e.g., an RF signal). The RF module 1527 may include a transceiver, a power amplifier module (PAM), a frequency filter, a low noise amplifier (LNA), an antenna, etc. According to an embodiment of the present disclosure, at least one of the cellular module 1521, the Wi-Fi module 1522, the BT module 1523, the GNSS module 1524, the NFC module 1525, or the MST module 1526 may transmit and receive an RF signal through a separate RF module.

The SIM 1529 may include a card and/or embedded SIM that includes a SIM and may include unique identify information (e.g., integrated circuit card identifier (ICCID)) or subscriber information (e.g., international mobile subscriber identity (IMSI)).

The memory 1530 may include an internal memory 1532 or an external memory 1534. The internal memory 1532 may include at least one of a volatile memory (e.g., a dynamic random access memory (DRAM), a static RAM (SRAM), a synchronous DRAM (SDRAM), etc.), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), etc.), a hard drive, or a solid state drive (SSD).

The external memory 1534 may further include a flash drive such as compact flash (CF), secure digital (SD), micro secure digital (Micro-SD), mini secure digital (Mini-SD), extreme digital (xD), a multimedia card (MMC), a memory stick, etc. The external memory 1534 may be operatively and/or physically connected to the electronic device 1501 through various interfaces.

A security module 1536 may be a module that includes a storage space of which a security level is higher than that of the memory 1530, and may be a circuit that guarantees safe data storage and a protected execution environment. The security module 1536 may be implemented with a separate circuit and may include a separate processor. For example, the security module 1536 may be in a smart chip or a SD card, which is removable, or may include an embedded secure element (eSE) embedded in a fixed chip of the electronic device 1501. Furthermore, the security module 1536 may operate based on an OS that is different from the OS of the electronic device 1501. For example, the security module 1536 may operate based on java card open platform (JCOP) OS.

The sensor module 1540 may measure a physical quantity or may detect an operation state of the electronic device 1501. The sensor module 1540 may convert the measured or detected information to an electric signal. The sensor module 1540 may include at least one of a gesture sensor 1540A, a gyro sensor 1540B, a barometric pressure sensor 1540C, a magnetic sensor 1540D, an acceleration sensor 1540E, a grip sensor 1540F, the proximity sensor 1540G, a color sensor 1540H (e.g., RGB sensor), a biometric sensor 1540I, a temperature/humidity sensor 1540J, an illuminance sensor 1540K, or an UV sensor 1540M. The sensor module 1540 may further include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1540 may further include a control circuit for controlling at least one or more sensors included therein. According to an embodiment of the present disclosure, the electronic device 1501 may further include a processor that is a part of the processor 1510 or independent of the processor 1510, and is configured to control the sensor module 1540. The processor may control the sensor module 1540 while the processor 1510 remains at a sleep state.

The input device 1550 may include a touch panel 1552, a (digital) pen sensor 1554, a key 1556, or an ultrasonic input unit 1558. The touch panel 1552 may use at least one of capacitive, resistive, infrared, and ultrasonic detecting methods. Also, the touch panel 1552 may further include a control circuit. The touch panel 1552 may further include a tactile layer to provide a tactile reaction to a user.

The (digital) pen sensor 1554 may be a part of a touch panel or may include an additional sheet for recognition. The key 1556 may include a physical button, an optical key, or a keypad. The ultrasonic input device 1558 may detect (or sense) an ultrasonic signal, which is generated from an input device, through a microphone 1588 and may check data corresponding to the detected ultrasonic signal.

The display 1560 may include a panel 1562, a hologram device 1564, or a projector 1566. The panel 1562 may be the same as or similar to the display 1460. The panel 1562 may be implemented to be flexible, transparent, or wearable. The panel 1562 and the touch panel 1552 may be integrated into a single module. The hologram device 1564 may display a stereoscopic image in a space using a light interference phenomenon. The projector 1566 may project light onto a screen so as to display an image. The screen may be arranged in the inside or the outside of the electronic device 1501. According to an embodiment of the present disclosure, the panel 1562 may include a pressure sensor (or force sensor) that measures the intensity of touch pressure by a user. The pressure sensor may be integrated with the touch panel 1552, or may be implemented as at least one sensor separately from the touch panel 1552. The display 1560 may further include a control circuit for controlling the panel 1562, the hologram device 1564, or the projector 1566.

The interface 1570 may include an HDMI 1572, a USB 1574, an optical interface 1576, or a D-subminiature (D-sub) 1578. The interface 1570 may be included in the communication interface 1470. The interface 1570 may include a mobile high definition link (MHL) interface, a SD card/multi-media card (MMC) interface, or an Infrared Data Association (IrDA) standard interface.

The audio module 1580 may convert a sound and an electric signal in dual directions. At least a part of the audio module 1580 may be included in the input/output interface 1450. The audio module 1580 may process sound information that is input or output through a speaker 1582, a receiver 1584, an earphone 1586, or the microphone 1588.

The camera module 1591 may shoot a still image or a video. According to an embodiment of the present disclosure, the camera module 1591 may include at least one or more image sensors (e.g., a front sensor or a rear sensor), a lens, an ISP, or a flash (e.g., an LED or a xenon lamp).

The power management module 1595 may manage power of the electronic device 1501. A power management integrated circuit (PMIC), a charger IC, or a battery gauge may be included in the power management module 1595. The PMIC may have a wired charging method and/or a wireless charging method. The wireless charging method may include a magnetic resonance method, a magnetic induction method or an electromagnetic method, and may further include an additional circuit, for example, a coil loop, a resonant circuit, a rectifier, etc. The battery gauge may measure a remaining capacity of the battery 1596, and a voltage, current or temperature thereof while the battery is charged. The battery 1596 may include a rechargeable battery and/or a solar battery.

The indicator 1597 may display a specific state of the electronic device 1501 or a part thereof (e.g., the processor 1510), such as a booting state, a message state, a charging state, etc. The motor 1598 may convert an electrical signal into a mechanical vibration and may generate a vibration effect, a haptic effect, etc. A processing device (e.g., a GPU) for supporting a mobile TV may be included in the electronic device 1501. The processing device for supporting the mobile TV may process media data according to the standards of digital multimedia broadcasting (DMB), digital video broadcasting (DVB), MediaFLO™, etc.

According to various embodiments of the present disclosure, each of the above-mentioned elements of the electronic device may be configured with one or more components, and the names of the elements may be changed according to the type of the electronic device. The electronic device may include at least one of the above-mentioned elements, and some elements may be omitted or other additional elements may be added. Furthermore, some of the elements of the electronic device may be combined with each other so as to form one entity, so that the functions of the elements may be performed in the same manner as before the combination.

Figure 16:
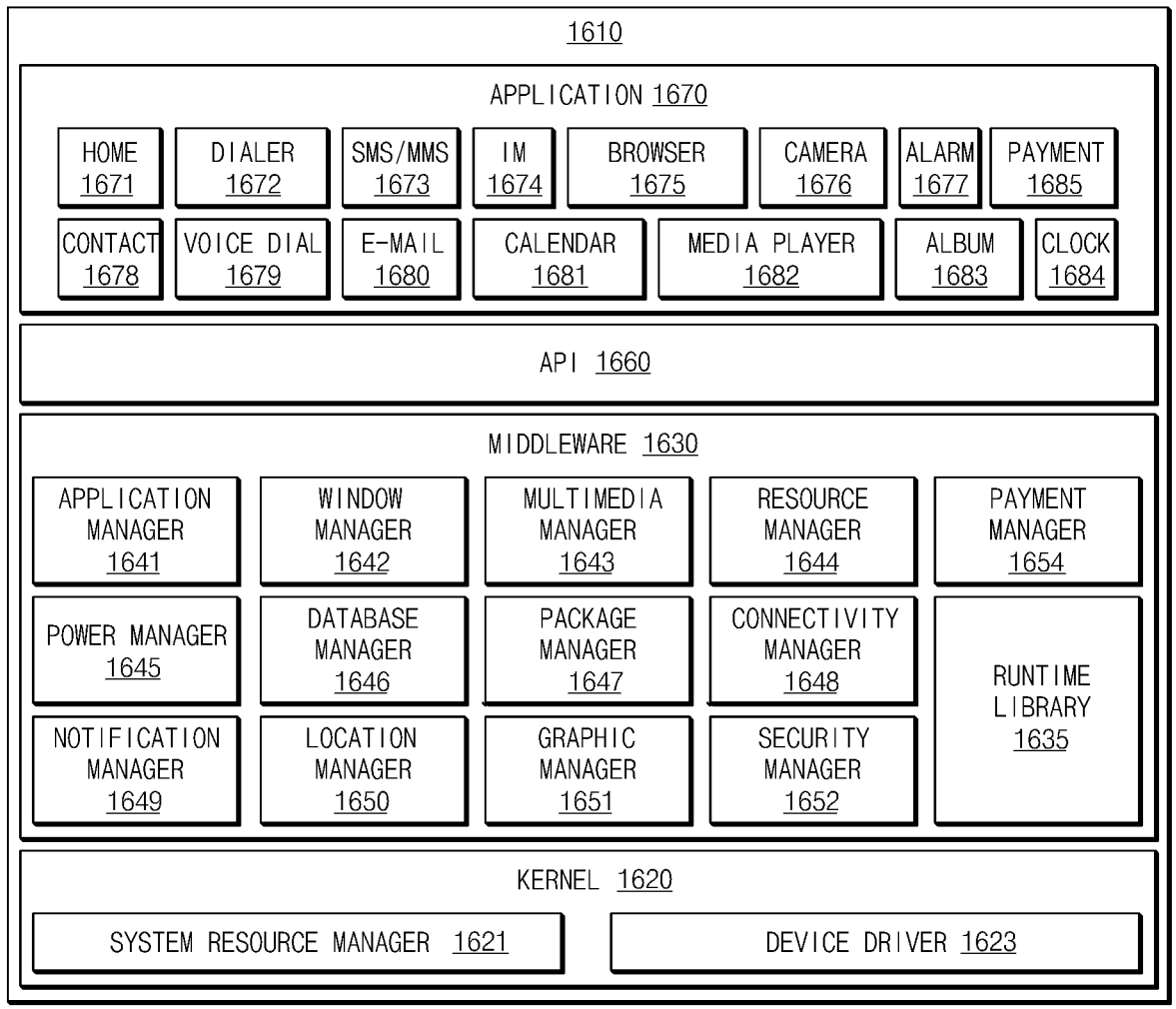
FIG. 16 illustrates a block diagram of a program module, according to various embodiments of the present disclosure.

FIG. 16 illustrates a block diagram of a program module, according to various embodiments of the present disclosure.

Referring to FIG. 16, a program module 1610 may include an OS to control resources associated with an electronic device, and/or diverse applications driven on the OS. The OS may be Android™, iOS™, Windows™, Symbian™, Tizen™, or Bada™ The program module 1610 may include a kernel 1620, a middleware 1630, an API 1660, and/or an application 1670. At least a portion of the program module 1610 may be preloaded on an electronic device or may be downloadable from an external electronic device 1402, 1404, 1406, etc.).

The kernel 1620 may include a system resource manager 1621 or a device driver 1623. The system resource manager 1621 may control, allocate, or retrieve system resources. According to an embodiment of the present disclosure, the system resource manager 1621 may include a process managing unit, a memory managing unit, a file system managing unit, etc. The device driver 1623 may include a display driver, a camera driver, a Bluetooth driver, a shared memory driver, a USB driver, a keypad driver, a Wi-Fi driver, an audio driver, or an inter-process communication (IPC) driver.

The middleware 1630 may provide, a function that the application 1670 needs in common, or may provide functions to the application 1670 through the API 1660 to allow the application 1670 to efficiently use limited system resources of the electronic device. According to an embodiment of the present disclosure, the middleware 1630 may include at least one of a runtime library 1635, an application manager 1641, a window manager 1642, a multimedia manager 1643, a resource manager 1644, a power manager 1645, a database manager 1646, a package manager 1647, a connectivity manager 1648, a notification manager 1649, a location manager 1650, a graphic manager 1651, a security manager 1652, or a payment manager 1654.

The runtime library 1635 may include a library module that is used by a compiler to add a new function through a programming language while the application 1670 is being executed. The runtime library 1635 may perform input/output management, memory management, or capacities about arithmetic functions.

The application manager 1641 may manage a life cycle of at least one application of the application 1670. The window manager 1642 may manage a graphic user interface (GUI) resource that is used on a screen. The multimedia manager 1643 may identify a format necessary for playing diverse media files, and may perform encoding or decoding of media files by using a codec suitable for the format. The resource manager 1644 may manage resources such as a storage space, memory, or source code of at least one application of the application 1670.

The power manager 1645 may operate with a basic input/output system (BIOS) to manage a battery or power, and may provide power information for an operation of an electronic device. The database manager 1646 may generate, search for, or modify a database that is to be used in at least one application of the application 1670. The package manager 1647 may install or update an application that is distributed in the form of package file.

The connectivity manager 1648 may manage a wireless connection such as Wi-Fi or Bluetooth. The notification manager 1649 may display or notify an event such as an arrival message, an appointment, or a proximity notification in a mode that does not disturb a user. The location manager 1650 may manage location information about an electronic device. The graphic manager 1651 may manage a graphic effect that is provided to a user, or manage a user interface relevant thereto. The security manager 1652 may provide a general security function necessary for system security, user authentication, etc. According to an embodiment of the present disclosure, in the case where an electronic device includes a telephony function, the middleware 1630 may further include a telephony manager for managing a voice or video call function of the electronic device.

The middleware 1630 may include a middleware module that combines functions of the above-described elements. The middleware 1630 may provide a module specialized to each type of OS to provide differentiated functions. Additionally, the middleware 1630 may dynamically remove a part of the preexisting elements or may add new elements thereto.

The API 1660 may be a set of programming functions and may be provided with a configuration that is variable depending on an OS. For example, in the case where an OS is the Android or the iOS type, it may provide one API set per platform. In the case where an OS is the Tizen type, it may provide two or more API sets per platform.

The application 1670 may include one or more applications capable of providing functions for a home application 1671, a dialer application 1672, an SMS/MMS application 1673, an instant message (IM) application 1674, a browser application 1675, a camera application 1676, an alarm application 1677, a contact application 1678, a voice dial application 1679, an e-mail application 1680, a calendar application 1681, a media player application 1682, an album application 1683, a clock application 1684, a payment application 1685, a healthcare application (e.g., measuring an exercise quantity, blood sugar level, etc.), or an application offering environment information (e.g., information of barometric pressure, humidity, temperature, etc.). The camera module 100 may be controlled based on various instructions, data, etc. included in the camera application 1676.

According to an embodiment of the present disclosure, the application 1670 may include an information exchanging application to support information exchange between an electronic device and an external electronic device. The information exchanging application may include a notification relay application for transmitting specific information to an external electronic device, or a device management application for managing the external electronic device.

The notification relay application may include a function of transmitting notification information, which arise from other applications (e.g., applications for SMS/MMS, e-mail, healthcare, or environmental information), to an external electronic device. Additionally, the notification relay application may receive notification information from an external electronic device and provide the notification information to a user.

The device management application may manage (e.g., install, delete, or update) at least one function (e.g., turn-on/turn-off of an external electronic device itself (or a part of components) or adjustment of brightness (or resolution) of a display) of the external electronic device which communicates with the electronic device, an application running in the external electronic device, or a service (e.g., a call service, a message service, etc.) provided from the external electronic device.

According to an embodiment of the present disclosure, the application 1670 may include an application (e.g., a healthcare application of a mobile medical device) that is to assigned in accordance with an attribute of an external electronic device. The application 1670 may include an application that is received from an external electronic device. The application 1670 may include a preloaded application or a third party application that is downloadable from a server. The names of elements of the program module 1610 may be modifiable depending on the type of the OS.

According to various embodiments of the present disclosure, at least a portion of the program module 1610 may be implemented by software, firmware, hardware, or a combination of two or more thereof. At least a portion of the program module 1610 may be implemented (e.g., executed) by the processor. At least a portion of the program module 1610 may include modules, programs, routines, sets of instructions, processes, etc. for performing one or more functions.

The term "module" used in the present disclosure may represent a unit including one or more combinations of hardware, software, and firmware. The term "module" may be interchangeably used with the terms "unit", "logic", "logical block", "component", and "circuit". The "module" may be a minimum unit of an integrated component or may be a part thereof. The "module" may be a minimum unit for performing one or more functions or a part thereof. The "module" may be implemented mechanically or electronically. The "module" may include at least one of an application specific IC (ASIC) chip, a field programmable gate array (FPGA), and a programmable-logic device for performing some operations, which are known or will be developed in the future.

At least a part of an apparatus (e.g., modules or functions thereof) or a method (e.g., operations) according to various embodiments of the present disclosure may be implemented by instructions stored in computer-readable storage media in the form of a program module. The instruction, when executed by a processor, may cause the one or more processors to perform a function corresponding to the instruction.

A computer-readable recording medium may include a hard disk, a floppy disk, a magnetic media (e.g., a magnetic tape), an optical media (e.g., a compact disc read only memory (CD-ROM) and a DVD, a magneto-optical media (e.g., a floptical disk)), and hardware devices (e.g., a ROM, a RAM, or a flash memory). Also, a program instruction may include not only assembly code such as things generated by a compiler but also a high-level language code executable on a computer using an interpreter. The above hardware unit may be configured to operate via one or more software modules for performing an operation of various embodiments of the present disclosure, and vice versa.

A module or a program module according to various embodiments of the present disclosure may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments of the present disclosure thereof, it will be understood by those skilled in the art that various changes in form and details may be made therein without departing from the spirit and scope of the present disclosure as defined by the appended claims and their equivalents.

What is claimed is:

1. An image sensor comprising:
a first group of pixels including a first color filter passing light having a first wavelength range;
a second group of pixels including a second color filter passing light having a second wavelength range; and
a third group of pixels including a third color filter passing light having a third wavelength range,
wherein the first wavelength range is longer than the second wavelength range, and the second wavelength range is longer than the third wavelength range,
wherein a second pixel in the second group of pixels or a third pixel in the third group of pixels includes a plurality of photoelectric conversion devices, and a first pixel of the first group of pixels includes a single photoelectric conversion device, and
wherein each pixel in the second pixel group and the third pixel group includes two photoelectric conversion devices.

2. The image sensor of claim 1, wherein the plurality of photoelectric conversion devices in the second pixel or the third pixel have equal light receiving areas.

3. The image sensor of claim 1, wherein each of some pixels in the second group of pixels includes two photoelectric conversion devices and each remaining pixel in the second group of pixels includes one photoelectric conversion device.

4. The image sensor of claim 1, wherein each of some pixels in the first group of pixels includes a mask configured to block a portion of light which has passed through the first color filter.

5. The image sensor of claim 1, wherein the first wavelength range corresponds to red light, the second wavelength range corresponds to green light, and the third wavelength range corresponds to blue light.

6. The image sensor of claim 1, wherein the first color filter is designed to further pass light having at least a portion of the third wavelength range, the second color filter is designed to further pass light having at least a portion of the first wavelength range, and the third color filter is designed to further pass light having at least a portion of the second wavelength range.

7. The image sensor of claim 6, wherein light passing through the first color filter corresponds to magenta light, light passing through the second color filter corresponds to yellow light, and light passing through the third color filter corresponds to cyan light.

8. The image sensor of claim 1, wherein the number of pixels in the second group of pixels is twice as large as the number of pixels in the first group of pixels or the number of pixels in the third group of pixels.

9. The image sensor of claim 1, further comprising:
a fourth group of pixels including a fourth color filter passing light having at least a portion of the second wavelength range and light having at least a portion of the third wavelength range,
wherein the first color filter is designed to further pass light having at least a portion of the third wavelength range, and the second color filter is designed to further pass light having at least a portion of the first wavelength range.

10. The image sensor of claim 9, wherein light passing through the first color filter corresponds to magenta light, light passing through the second color filter corresponds to yellow light, light passing through the third color filter corresponds to green light, and light passing through the fourth color filter corresponds to cyan light.

11. The image sensor of claim 9, wherein the second pixel includes a single photoelectric conversion device, and
wherein each of the third pixel and a fourth pixel in the fourth group of pixels includes a plurality of photoelectric conversion devices.

12. The image sensor of claim 9, wherein the number of pixels in the first group of pixels, the number of pixels in the second group of pixels, the number of pixels in the third group of pixels, and the number of pixels in the fourth group of pixels are equal.

* * * * *